United States Patent [19]

Tahara et al.

[11] Patent Number: 5,363,203
[45] Date of Patent: Nov. 8, 1994

[54] STILL PICTURE TRANSMITTING SYSTEM

[75] Inventors: Tomonori Tahara; Tetsuya Yamamoto; Yasuyuki Baba; Hideki Koyanagi; Akira Uchida, all of Kanagawa, Japan

[73] Assignee: Sony Corporation, Tokyo, Japan

[21] Appl. No.: 904,578

[22] Filed: Jun. 26, 1992

[30] Foreign Application Priority Data

Jun. 27, 1991 [JP] Japan ................. 3-157091
Jun. 28, 1991 [JP] Japan ................. 3-158689

[51] Int. Cl.⁵ .......................... H04N 1/46; H04N 1/21
[52] U.S. Cl. ................................ 358/403; 395/114; 395/116; 395/425
[58] Field of Search ............ 358/10, 500, 501, 524, 358/335, 400, 401, 403, 404, 442, 468, 479; 395/100, 101, 106, 114, 115, 116, 117, 200, 325, 425; 379/90, 100

[56] References Cited

U.S. PATENT DOCUMENTS

| | | | |
|---|---|---|---|
| 4,802,008 | 1/1989 | Walling | 358/141 |
| 4,953,196 | 8/1990 | Ishikawa et al. | 379/53 |
| 5,179,652 | 1/1993 | Rozmanith et al. | 395/155 |
| 5,185,857 | 2/1993 | Rozmanith et al. | 395/148 |
| 5,208,745 | 5/1993 | Quentin et al. | 364/188 |

*Primary Examiner*—Bentsu Ro
*Attorney, Agent, or Firm*—Jay H. Maioli

[57] ABSTRACT

A system for transmitting still picture data between a first still picture transmitter with a display device and a keyboard disposed on one panel, and a second still picture transmitter with a display device and a keyboard disposed separately. The second still picture transmitter comprises memory means for storing a plurality of still picture files with individual file names, and transfer means for transmitting or receiving the still pictures and the file names. The first still picture transmitter further comprises control means for reading out the data of the file names from the memory means via the transfer means of the second still picture transmitter.

10 Claims, 29 Drawing Sheets

F I G. 15
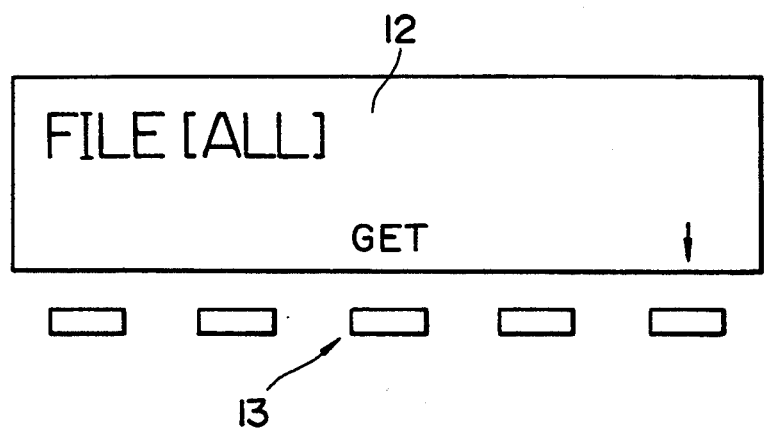

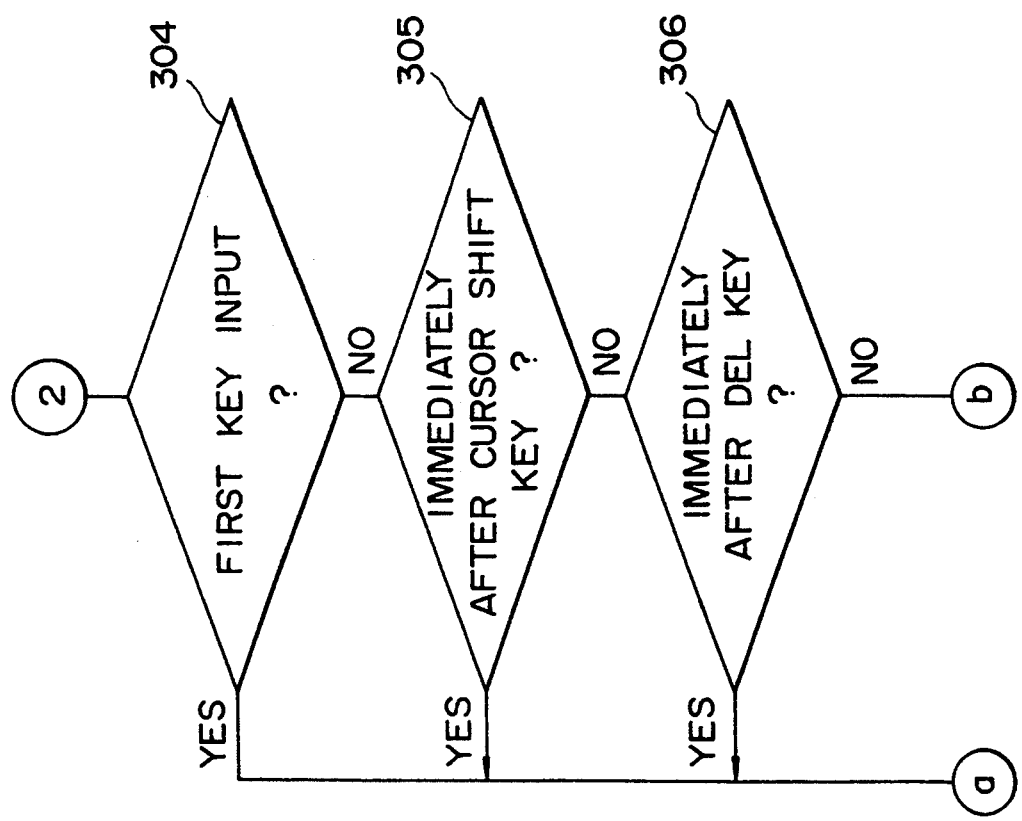

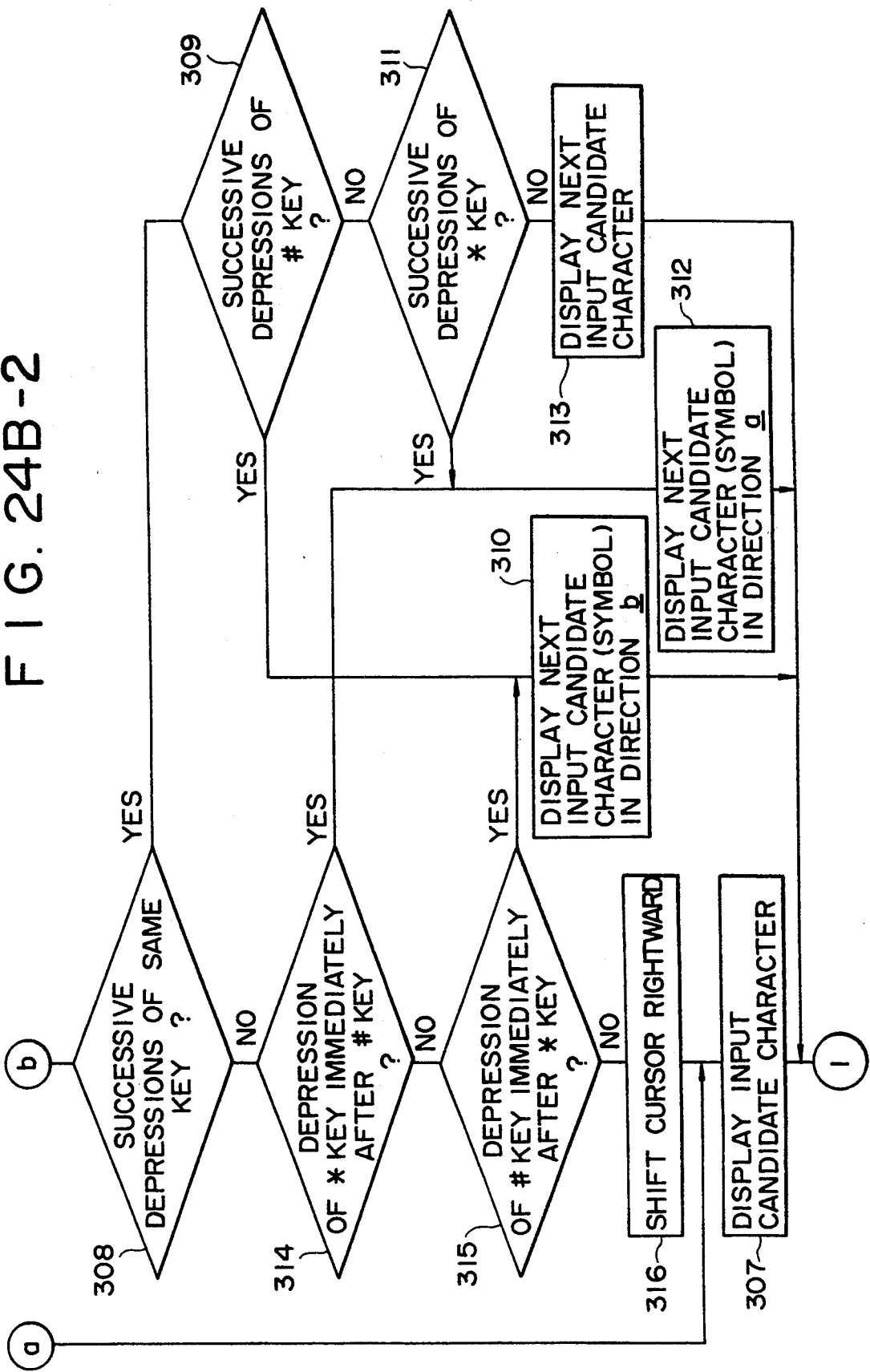

STILL PICTURE TRANSMITTING SYSTEM

BACKGROUND OF THE INVENTION

1. Field of the Invention

The present invention relates to a system for transmitting a still picture between two sites apart from each other.

2. Description of the Prior Art

There has been known heretofore a system for transmitting still picture data between a plurality of still picture transmitters. Generally the still picture transmitters are classified into a portable type and a stationary type. And a file unit such as a magneto-optical disk unit is connected to a stationary still picture transmitter. For example, still picture data is transmitted from a portable transmitter via a telephone line to a stationary transmitter.

However, since all of the conventional portable still picture transmitters are incapable of communicating with a stationary still picture transmitter, it is impossible to detect the names of still picture files recorded on a magneto-optical disk.

OBJECTS AND SUMMARY OF THE INVENTION

It is a principal object of the present invention to provide an improved still picture transmitting system which enables a portable still picture transmitter to search and retrieve the file name of any still picture stored in memory means of a stationary still picture transmitter.

Another object of the present invention resides in providing an improved still picture transmitting system where a portable still picture transmitter is capable of extracting, on the basis of file names, any of the still pictures stored in memory means of a stationary still picture transmitter.

In an attempt to achieve the principal object mentioned above, the present invention realizes improvements in a still picture transmitting system which transmits still picture data between a first still picture transmitter with a display device and a keyboard disposed on one panel, and a second still picture transmitter with a display device and a keyboard disposed separately, wherein the second still picture transmitter is equipped with memory means for storing therein a plurality of still picture files having individual file names, and transfer means for transmitting or receiving the still pictures and the file names therethrough; while the first still picture transmitter is equipped with control means for reading out the data of the file names from the memory means via the transfer means of the second still picture transmitter.

Also for the purpose of achieving another object mentioned above, the present invention realizes improvements in a still picture transmitting system which transmits still picture data between a first still picture transmitter with a display device and a keyboard disposed on one panel, and a second still picture transmitter with a display device and a keyboard disposed separately, wherein the second still picture transmitter is equipped with memory means for storing therein a plurality of still picture files having individual file names, and transfer means for transmitting or receiving the still pictures and the file names therethrough; while the first still picture transmitter is equipped with input means for inputting a file name, and control means for reading out the data of the still picture corresponding to the input file name from the memory means via the transfer means of the second still picture transmitter.

BRIEF DESCRIPTION OF THE DRAWINGS

FIG. 15 schematically shows exemplary display contents on the LCD of the portable still picture transmitter in the still picture transmitting system of FIG. 1;

FIGS. 24A and 24B are flow charts for explaining a character input operation performed from the keyboard of FIG. 22;

DESCRIPTION OF THE PREFERRED EMBODIMENTS

Hereinafter an exemplary embodiment of the present invention will be described in detail with reference to the accompanying drawings.

Figure 1:
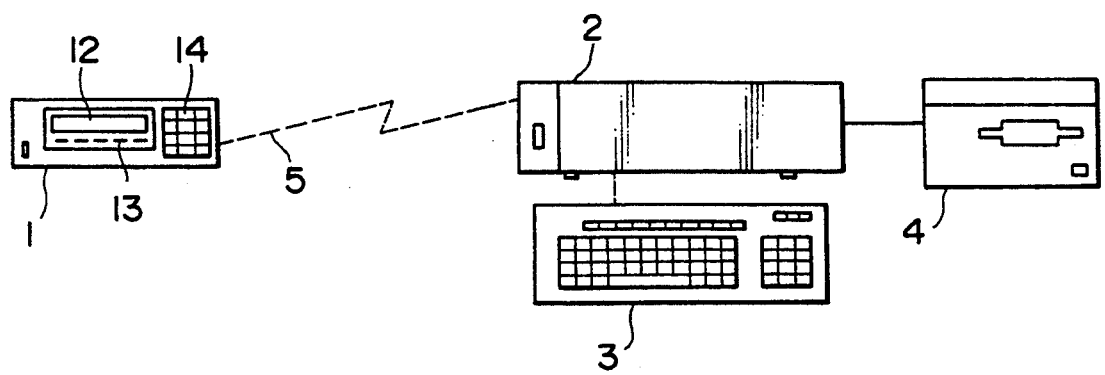
FIG. 1 schematically shows a general view of an exemplary embodiment representing the still picture transmitting system of the present invention.
Figure 2:
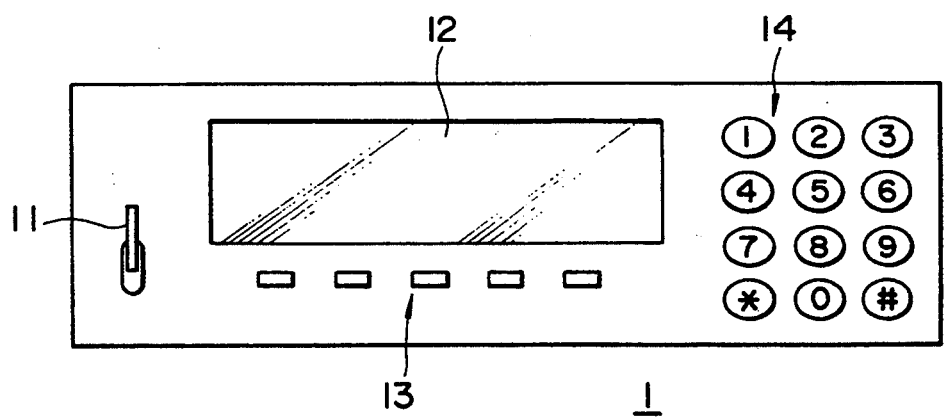
FIG. 2 illustrates an operator control panel of a portable still picture transmitter in the still picture transmitting system of FIG. 1.

FIG. 1 shows the constitution of a first embodiment representing the still picture transmitting system of the invention. In this diagram, reference numeral 1 denotes a portable still picture transmitter (SFU). FIG. 2 shows an operator control panel in the transmitter 1, including a power switch 11, a liquid crystal display device (LCD) 12, function keys 13 and numeral keys 14.

Referring back to FIG. 1, reference numeral 2 denotes a stationary still picture transmitter (DIH) including a keyboard 3 connected to the transmitter 2, and a magneto-optical disk unit 4 connected to the transmitter 2 to serve as a file unit.

The transmitters 1 and 2 are connected to each other via an analog telephone line 5 so that transmission or communication of still picture data can be performed between the transmitters 1 and 2.

Figure 3:
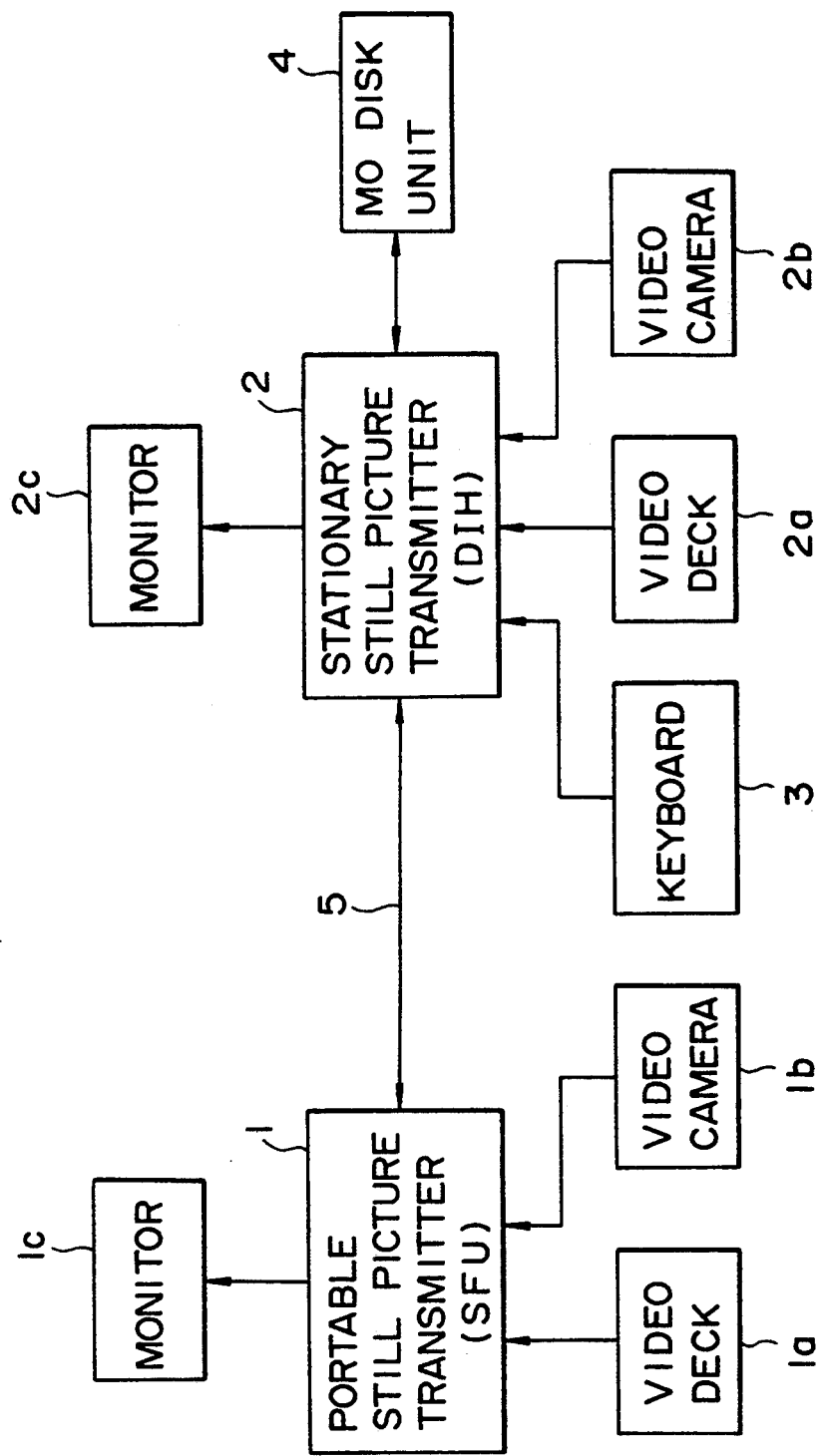
FIG. 3 is a block diagram showing the constitution of the still picture transmitting system of FIG. 1.

FIG. 3 is a block diagram of the still picture transmitting system where any components corresponding to those in FIG. 1 are denoted by the same reference numerals. In FIG. 3, a video deck 1a and a video camera 1b are connected as video signal input units to the transmitter 1, and a monitor 1c is also connected thereto as an output unit. Meanwhile a video deck 2a and a video camera 2b are connected as video signal input units to the transmitter 2, and further a monitor 2c is connected thereto as an output unit.

Figure 4:
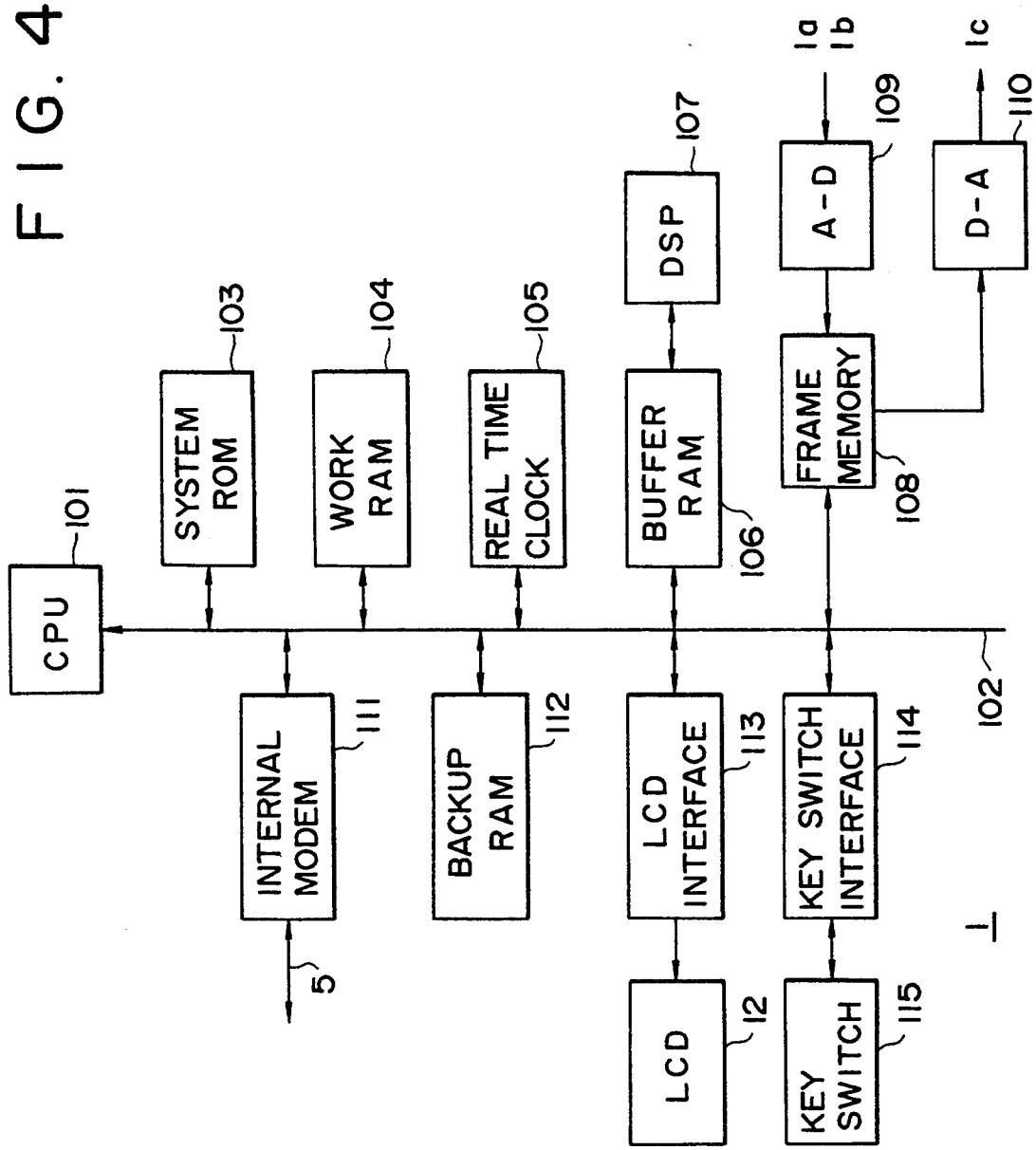
FIG. 4 is a block diagram showing the constitution of a portable still picture transmitter in the still picture transmitting system of FIG. 1.

The portable still picture transmitter 1 is so constituted as shown in FIG. 4. In this diagram, a system bus 102 is connected to a CPU 101. To the system bus 102, there are connected a ROM 103 where a processing program and so forth are stored for decoding (expanding) or encoding (compressing) data, a work RAM 104 used for data processing, and a real time clock 105 for outputting data of the date and time.

To the system bus 102, there is also connected a digital signal processor (DSP) 107 via a buffer RAM 106. The DSP 107 serves to encode (compress) and decode (expand) the still picture data.

A frame memory 108 is connected to the system bus 102. The frame memory 108 is supplied with the picture data obtained via an A-D converter 109 which digitizes the analog video signal output from the video deck 1a or the video camera 1b (shown in FIG. 3). Meanwhile the still picture data read out from the frame memory 108 is converted to an analog signal by a D-A converter 110 and then is supplied to the monitor 1c (shown in FIG. 3).

The system bus 102 is connected via an internal modem 111 to the analog telephone line 5. Transmission or communication of the still picture data is performed between the first transmitter 1 and the second transmitter 2 where such internal modem 111 is employed. The first transmitter 1 is not connectable to a digital circuit (ISDN circuit).

A backup RAM 112 is connected to the system bus 102. When the power supply is switched off, preset parameters are preserved in the backup RAM 112. And in response to turn-on of the power supply, the system is initialized according to such preset parameters.

The LCD 12 (shown in FIG. 2) is connected to the system bus 102 via a display interface 113 so as to display file names and functions corresponding to the function keys 13.

To the system bus 102, there is further connected, via a key switch interface 114, a key switch 115 including the function keys 13 and the numeral keys 14 (shown in FIG. 2).

Figure 5:
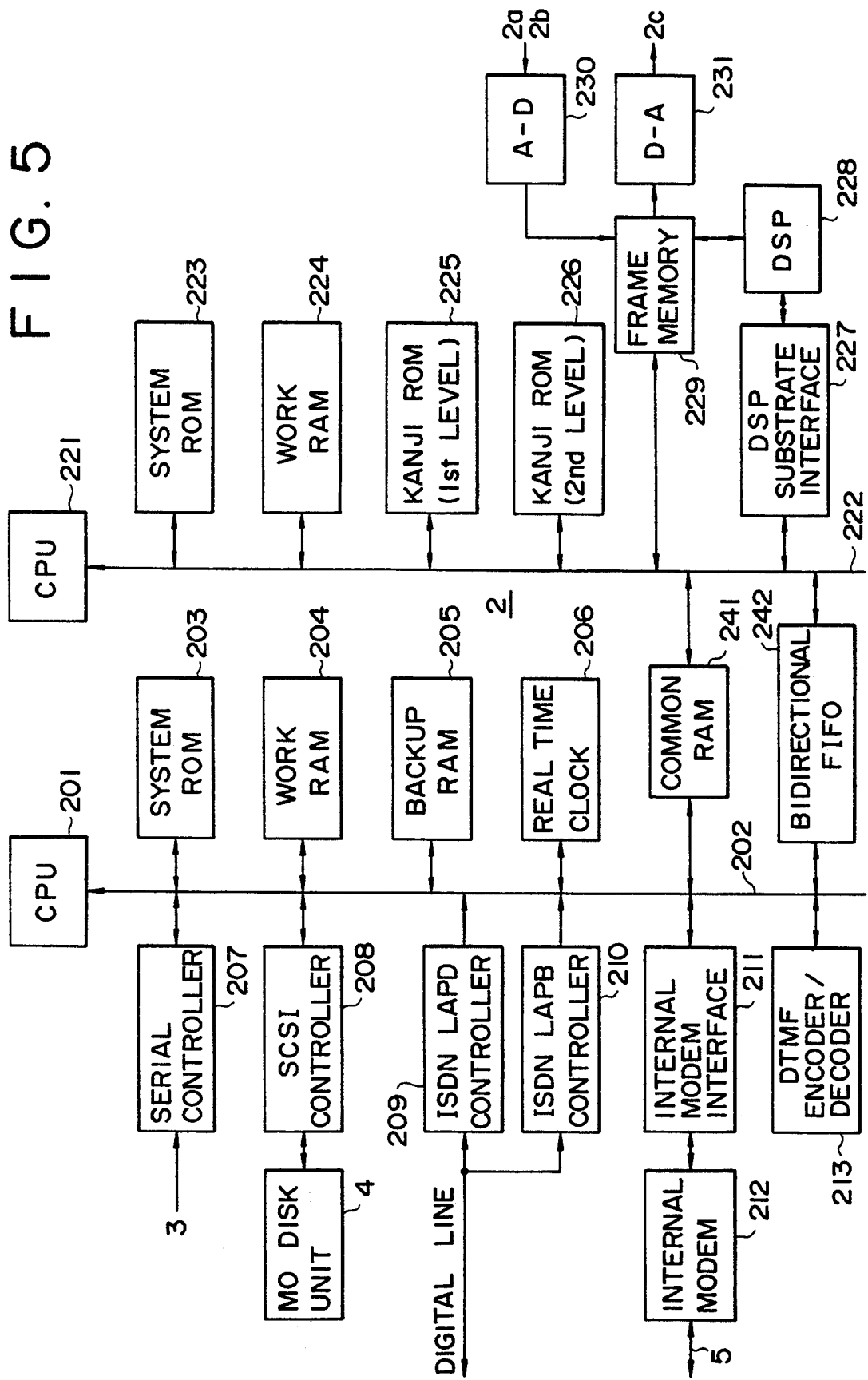
FIG. 5 is a block diagram showing the constitution of a stationary still picture transmitter in the still picture transmitting system of FIG. 1.

Meanwhile the stationary still picture transmitter 2 is so constituted as shown in FIG. 5. Denoted by 201 in this diagram is a CPU for controlling the write/read operation to the magneto-optical disk unit 4, the transmission and communication of the still picture data to the first transmitter 1, and the transmission of the still picture data to the encoder/decoder.

The system bus 202 is connected to the CPU 201. To the system bus 202, there are connected a system ROM (EPROM) 203 for storage of a processing program and so forth, a work RAM 204 used for data processing, and a real time clock 206 for outputting data of the date and time.

To the system bus 202 is connected a backup RAM 205 where preset parameters are preserved when the power supply is switched-off. And in response to turn-on of the power supply, the system is initialized according to such preset parameters.

A serial controller 207 is connected to the system bus 202. And the keyboard 3 (shown in FIG. 1) is connected via the controller 207 to the system bus 202.

To the system bus 202, there is also connected an SCSI controller 208. And the magneto-optical disk unit 4 is connected via this controller 208 to the system bus 202.

To the system bus 202, there are further connected an LAPD controller 209 for a control channel, and an LAPD controller 210 for a data channel. When the system bus 202 is connected to a digital circuit (ISDN circuit), such controllers 209 and 210 are interposed therebetween. Although connection to the transmitter 1 via a digital circuit is not permitted as described, connection to any other transmitter of the same kind as the transmitter 2 is possible.

The system bus 202 is connected to an analog telephone line 5 via an internal modem interface 211 and an internal modem 212. Transmission and communication of still picture data are performed from or to the transmitter 1 by means of such internal modem 212.

A DTMF encoder/decoder 213 is connected to the system bus 202.

Denoted by 221 is a CPU for controlling the operation of encoding (compressing) or decoding (expanding) the still picture data (natural image data), and the operation of decoding or encoding the character data or hand-written data.

A system bus 222 is connected to the CPU 221. To the system bus 222, there are connected a system ROM (EPROM) 223 for storage of a processing program and so forth, a work RAM 224 used for data processing, a first-level kanji ROM 225, and a second-level kanji ROM 226.

Also to the system bus 222, a digital signal processor (DSP) 228 is connected via a DSP substrate interface 227. The DSP 228 executes the process of encoding (compressing) and decoding (expanding) the still picture data.

A frame memory 229 is connected to the system bus 222. The frame memory 229 is supplied with the still picture data obtained via an A-D converter 230 which digitizes the analog video signal output from the video deck 2a or the video camera 2b (shown in FIG. 3). Meanwhile the still picture data read out from the frame memory 229 is converted to an analog signal by a D-A converter 231 and then is supplied to the monitor 2c (shown in FIG. 3). The DSP 228 is connected directly to the frame memory 229.

A common RAM 241 and a bidirectional FIFO 242 are connected between the data buses 202 and 222. In the common RAM 241, the data indicative of the decoding or encoding process is stored each time. And the bidirectional FIFO 242 is used for transmission of the still picture data therethrough between the system buses 202 and 222.

In the constitutions mentioned above, the data written in the frame memory 108 of the transmitter 1 is sent to the transmitter 2 in the following procedure.

The still picture data written in the frame memory 108 is first encoded (compressed) by the DSP 107 and then is supplied via the internal modem 111 to the telephone line 5, from which the data is further supplied to the internal modem 212 of the transmitter 2.

The still picture data from the internal modem 212 is stored in the work RAM 204 via the internal modem interface and the system bus 202. Then the still picture data read out from the work RAM 204 is supplied to the DSP 228 via the system bus 202, the bidirectional FIFO 242, the system bus 222 and the DSP substrate interface 227, so that the data is decoded (expanded). The still picture data thus decoded by the DSP 228 is written in the frame memory 229, and the picture represented by such data is displayed on the monitor 2c.

Meanwhile the still picture data output from the work RAM 204 is supplied also to the magneto-optical disk unit 4 via the system bus 202 and the SCSI controller 208, and is recorded on a magneto-optical (MO) disk when required.

Hereinafter a description will be given in another case where the still picture data written in the frame memory 229 of the second transmitter 2 is sent to the first transmitter 1.

The still picture data written in the frame memory 229 is encoded (compressed) by the DSP 228 and then is supplied to the telephone line 5 via the system bus 222, the bidirectional FIFO 242, the system bus 202, the internal modem interface 211 and the internal modem 212. The data is further supplied from the telephone line 5 to the internal modem 111 of the transmitter 1.

The still picture data from the internal modem 111 is stored in the work RAM 104 via the system bus 102. Then the still picture data read out from the work work RAM 104 is supplied to the DSP 107 via the system bus 102 and the buffer RAM 106, so that the data is decoded (expanded). The still picture data thus decoded by the DSP 107 is written in the frame memory 108, and the picture represented by such data is displayed on the monitor 1c.

The still picture data recorded on the MO disk in the magneto-optical disk unit 4 is sent to the first transmitter 1 in the following procedure.

First the still picture data written in the MO disk is read out therefrom in the magneto-optical disk unit 4, and the still picture data thus obtained is supplied to the telephone line 5 via the SCSI controller 208, the system bus 202, the internal modem interface 211 and the internal modem 212. Then the data is further supplied from the telephone line 5 to the internal modem 111 of the first transmitter 1, The operation thereafter is the same as that in the aforementioned case where the still picture data written in the frame memory 229 of the transmitter 2 is sent to the first transmitter 1.

Now a description will be given in the next case where the still picture data written in the frame memory 229 of the second transmitter 2 is recorded and preserved on the MO disk.

The still picture data written in the frame memory 229 is encoded (compressed) by the DSP 228 and then is supplied to the magneto-optical disk unit 4 via the system bus 222, the bidirectional FIFO 232, the system bus 202 and the SCSI controller 208, so that the data is recorded and preserved on the MO disk.

The picture represented by the still picture data recorded on the MO disk of the magneto-optical disk unit 4 is displayed on the monitor 2c in the following procedure.

The still picture data recorded on the MO disk is read out therefrom in the magneto-optical disk unit 4 and then is supplied to the DSP 228 via the SCSI controller 208, the system bus 202, the bidirectional FIFO 242, the system bus 222 and the DSP substrate interface 227, so that the data is decoded (expanded). The still picture data thus decoded by the DSP 228 is then written in the frame memory 229, and the picture represented by such data is displayed on the monitor 2c.

In this embodiment, a request for the still picture file name recorded on the MO disk in the magneto-optical disk unit 4 can be sent from the first transmitter 1 via the telephone line 5 to the second transmitter 2.

Figure 6:
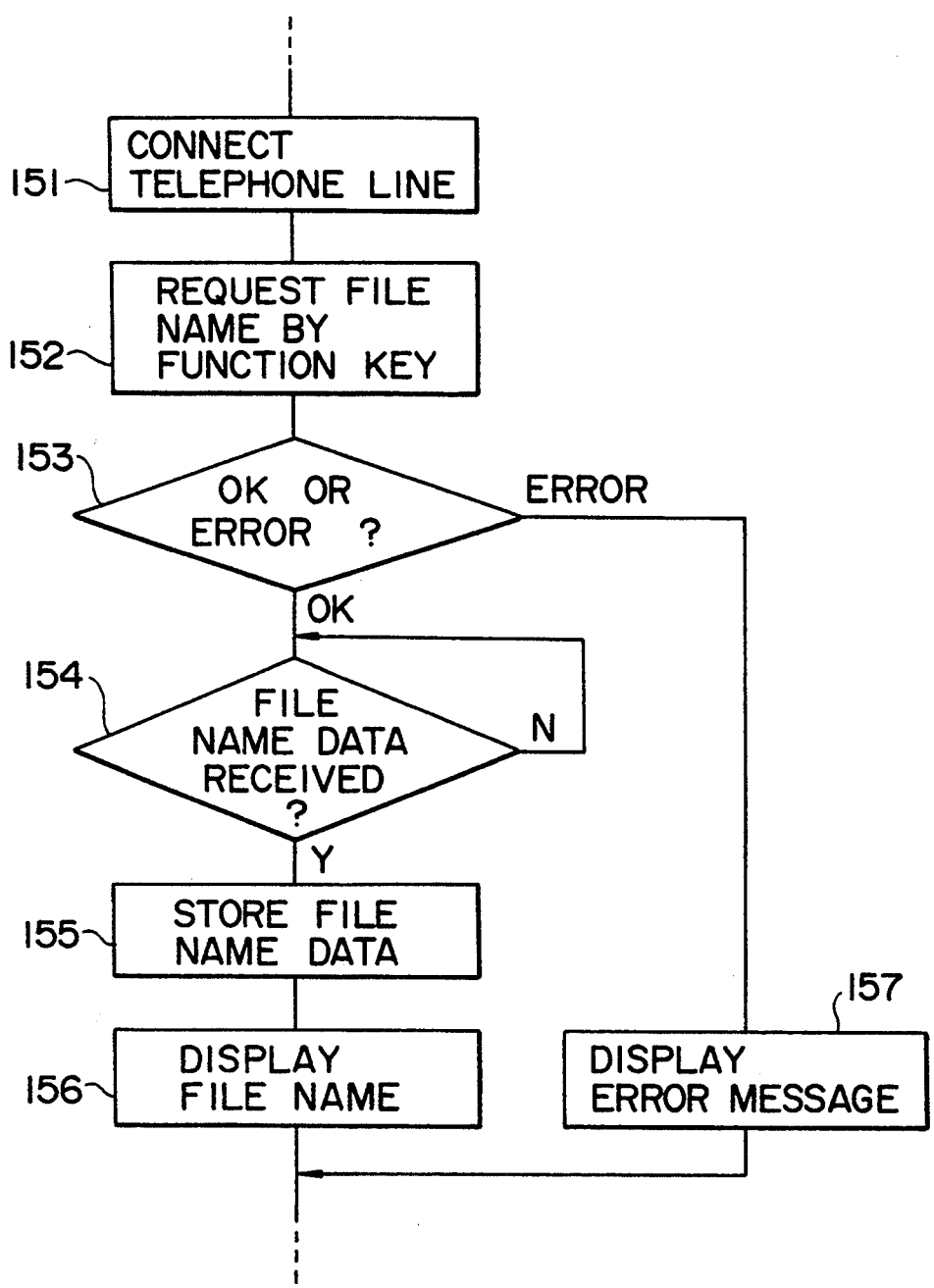
FIG. 6 is a flow chart for explaining the operation of the portable still picture transmitter in the still picture transmitting system of FIG. 1.

FIG. 6 is a flow chart for explaining the operation of the first transmitter 1 performed at the time of a request for the file name.

First the telephone line is connected to the second transmitter 2 by depressing the numeral keys 14 (shown in FIG. 2) (step 151).

Figure 9:
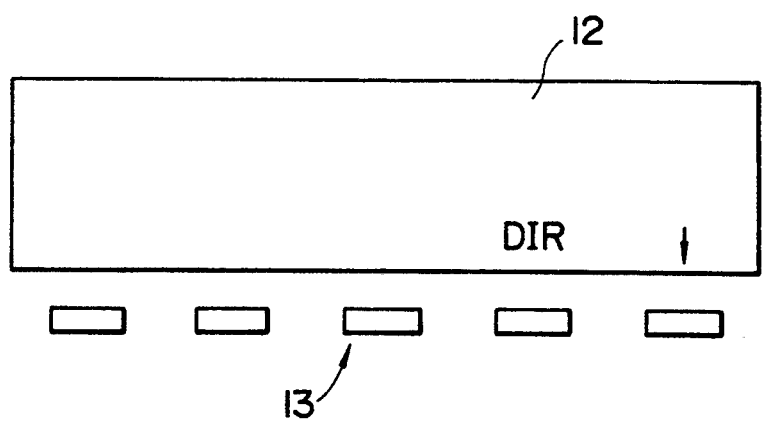
FIG. 9 schematically shows exemplary display contents on a liquid crystal display device (LCD) of the portable still picture transmitter in the still picture transmitting system of FIG. 1.

Subsequently the file name is requested by using the function key 13 (step 152). In this case, the key (corresponding to "↓" on the LCD 12) at the right end of the function keys 13 is depressed successively until "DIR" is displayed on the LCD 12 (as shown in the example of FIG. 9). Then, a depression of the key corresponding to "DIR" of the function keys 13 sends the file name request from the CPU 101 of the first transmitter 1 via the system bus 102 and the internal modem 111 to the second transmitter 2.

Thereafter a decision is made as to which of an OK message or an error message has been received (step 153). If the result of such decision signifies reception of the OK message, another decision is made as to whether the file name data has been received or not (step 154).

Figure 10:
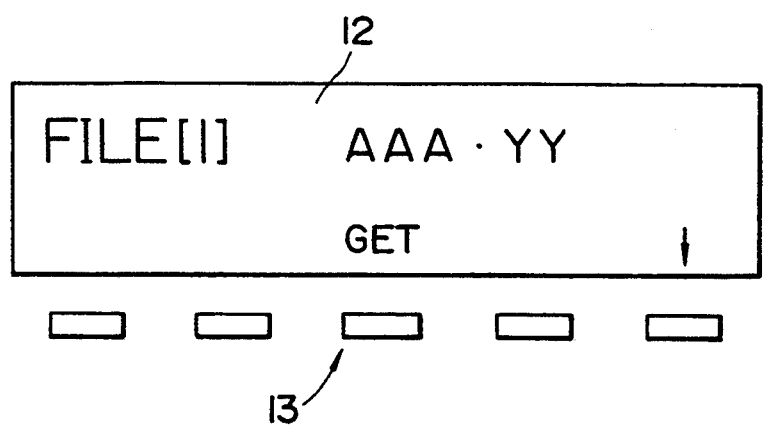
FIG. 10 schematically shows other exemplary display contents on the LCD of the portable still picture transmitter in the still picture transmitting system of FIG. 1.

When the result at step 154 is affirmative to signify reception of the file name data, the file name data is stored in the work RAM 104 (step 155), and the corresponding file name is displayed on the LCD 12 (step 156). In this stage, merely the first file name alone is displayed (as shown in the example of FIG. 10).

The other file names can also be displayed by manipulating the numeral keys 14. For example, when the key "5" is depressed, the serial number is shifted backward by 1 and the corresponding file name is displayed. Upon depression of the key "8", the serial number is shifted forward by 1 and the corresponding file name is displayed. When the key "2" is depressed, the serial number is shifted backward successively, and the corresponding file name is displayed in accordance therewith. And upon depression of the key "0", the serial number is shifted forward successively, and the corresponding file name is displayed in accordance therewith.

If the result of the decision at step 153 signifies reception of the error message, the error message is displayed on the LCD 12 (step 157).

Figure 7:
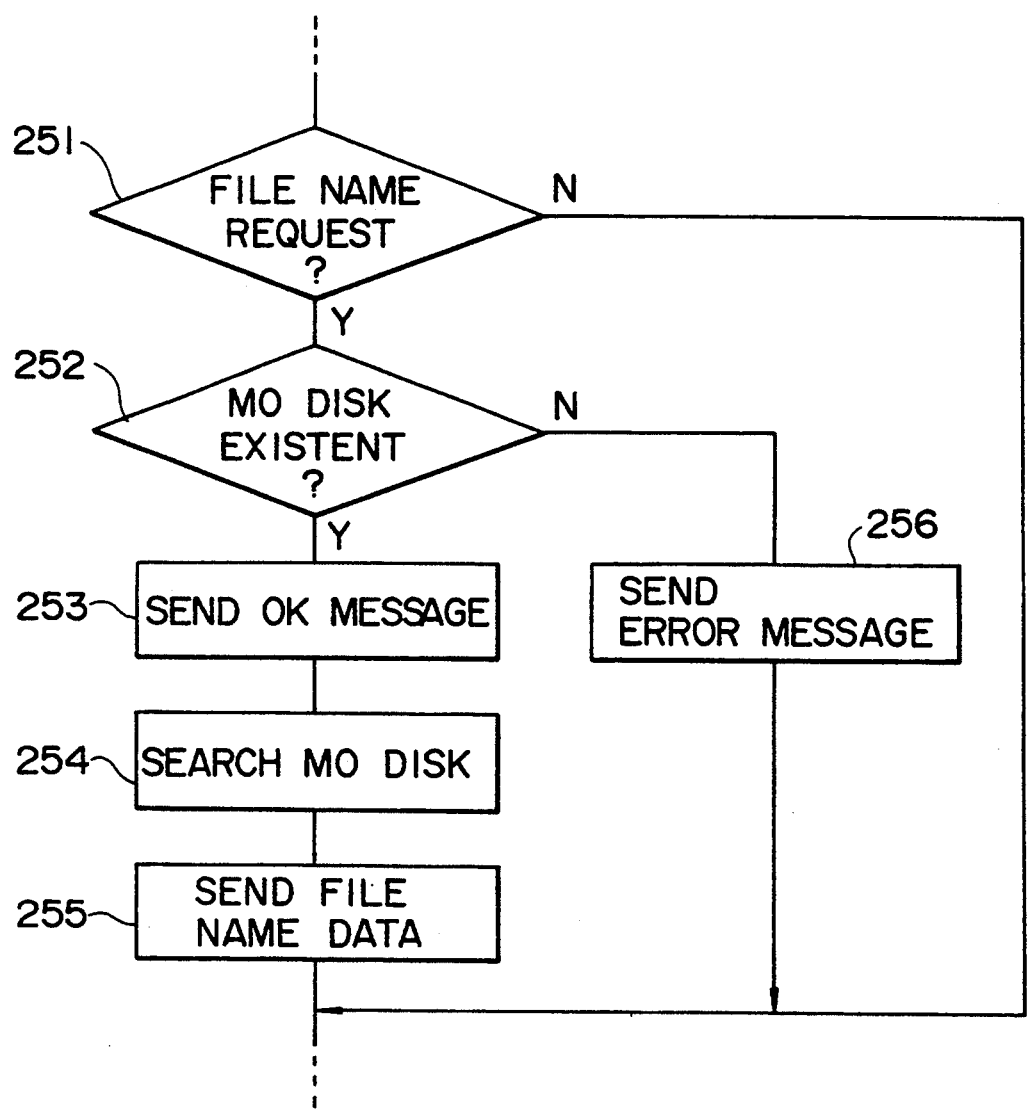
FIG. 7 is a flow chart for explaining the operation of the stationary still picture transmitter in the still picture transmitting system of FIG. 1.

FIG. 7 is a flow chart showing the operation of the second transmitter 2 performed at the time of requesting the file names from the first transmitter 1.

First a decision is made as to whether a file name request from the transmitter 1 has been received or not (step 251). If the result of such decision is affirmative to signify reception of the file name request, another decision is made as to whether any MO disk is present or not in the magneto-optical disk unit 4 (step 252). In case the magneto-optical disk unit 4 is not connected, the result of the decision signifies non-existence of any MO disk.

In case any MO disk is present, an OK message is sent from the CPU 201 to the transmitter 1 via the system bus 202, the internal modem interface 211 and the internal modem 212 (step 253).

Figure 8:
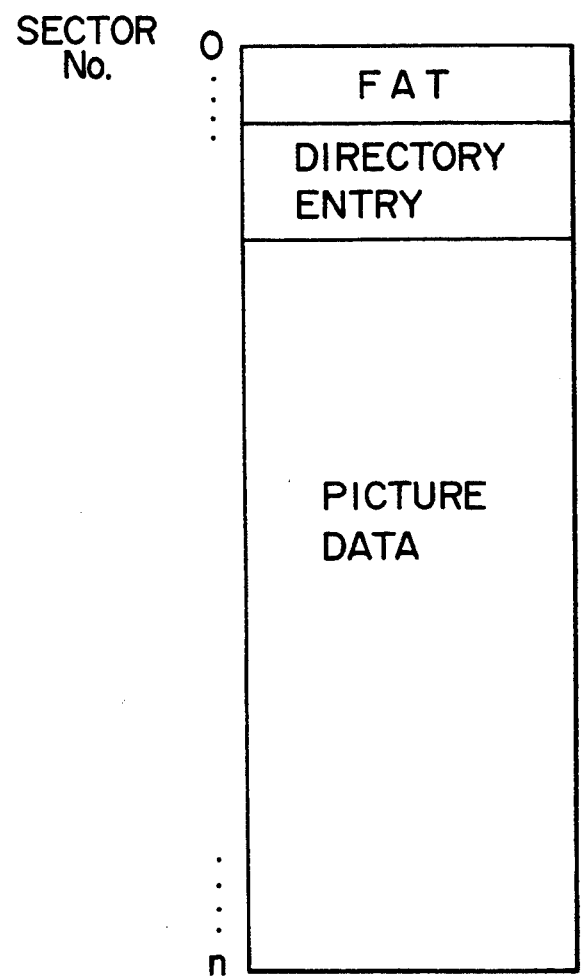
FIG. 8 schematically shows exemplary record contents on a magneto-optical disk in the still picture transmitting system of FIG. 1.

Next the MO disk is searched for retrieval under control of the CPU 201 (step 234). In this case, an area "DIRECTORY ENTRY" of the MO disk is searched. (The record content on the MO disk is shown in FIG. 8.) The file name data is recorded and preserved in this area when the still picture data is filed on the MO disk.

The file name data is read out from the MO disk and then is sent to the transmitter 1 via the SCSI controller 208, the system bus 202, the internal modem interface 211 and the internal modem 212 (step 255). When any still picture file is not existent, data indicating nonexistence of any file is sent instead of the file name data. In this case, nothing is displayed on the LCD 12 in the first transmitter 1.

If the result of the decision at step 252 signifies nonexistence of any MO disk, an error message is sent from the CPU 201 to the first transmitter 1 via the system bus 202, the internal modem interface 211 and the internal modem 212 (step 256).

Figure 11:
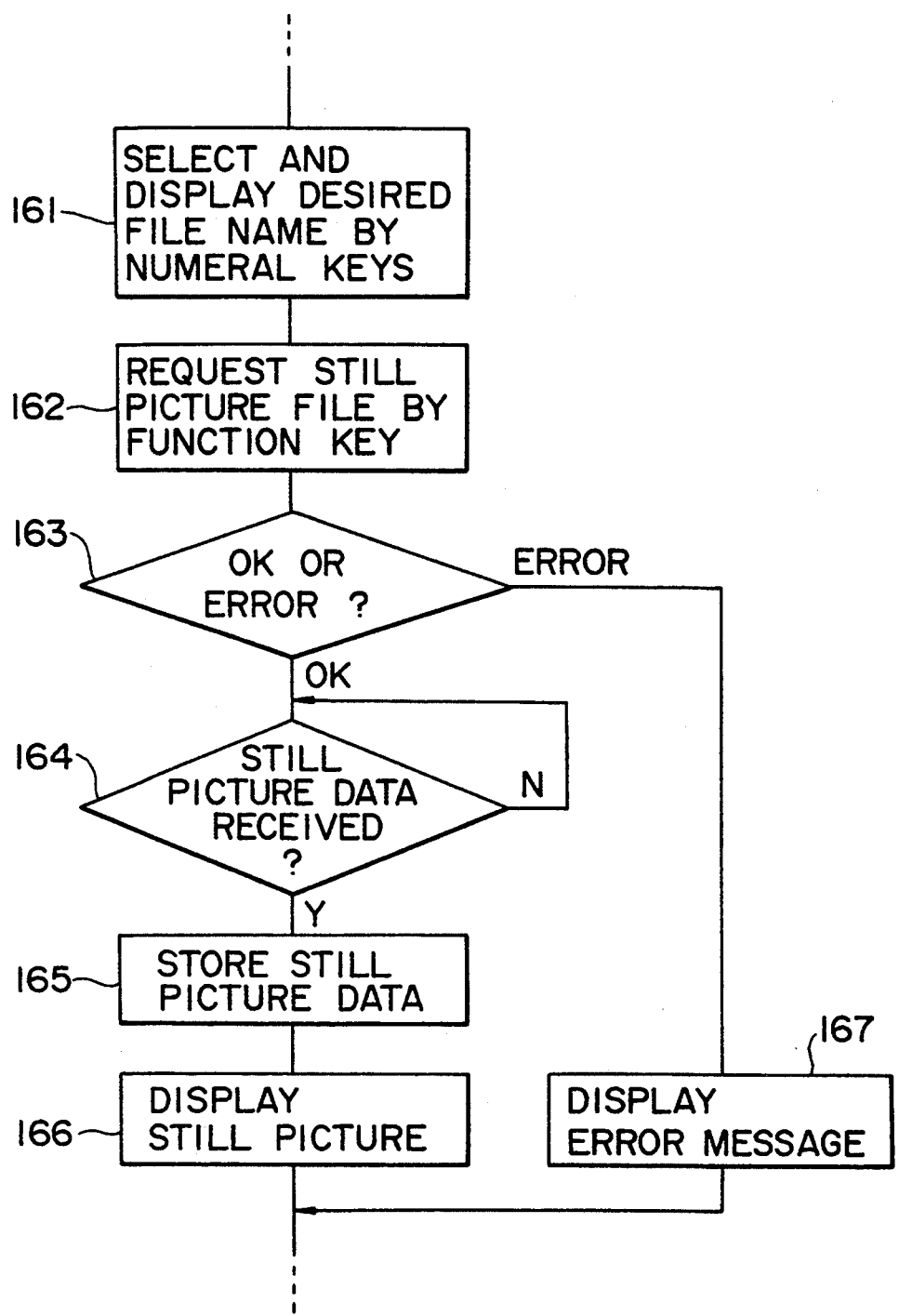
FIG. 11 is a flow chart for explaining the operation of the portable still picture transmitter in the still picture transmitting system of FIG. 1.

After reception of the file name data as mentioned above, the first transmitter 1 in this embodiment is capable of receiving the still picture file of any desired file name in the following procedure. FIG. 11 is a flow chart for explaining the operation of the first transmitter 1 performed at the time of requesting a still picture file.

First a desired file name is selected by depressing the keys "5", "8", "2" and "0" of the numeral keys 14 (shown in FIG. 2) as described, and the selected file name is displayed on the LCD 12 (step 161).

Subsequently the still picture file is requested by depressing the function key 12 (step 162). In this case, the key at the right end of the function keys 13 is successively depressed until "GET" is displayed on the LCD 12 (as shown in the example of FIG. 10). Immediately after reception of the file name data in response to the file name request, there is achieved a state where "GET" is displayed automatically on the LCD 12.

When the user depresses the key corresponding to "GET" out of the function keys 13 in the state mentioned above, a request for the still picture file data is sent from the CPU 101 of the first transmitter 1 to the second transmitter 2 via the system bus 102 and the internal modem 111. Such request is relative to the designated still picture file of the name displayed on the LCD 12.

Next a decision is made as to which of an OK message and an error message has been received (step 163). And if the result of such decision signifies reception of the OK message, another decision is made as to whether the still picture data has been received or not (step 164).

When the result at step 164 is affirmative to signify reception of the still picture data, the still picture data is stored in the work RAM 104 (step 165). And after being decoded (expanded) by the DSP 107, the still picture data is written in the frame memory 108, and the still picture contained in the designated still picture file is displayed on the monitor 1c (step 166).

In case the result of the decision at step 163 signifies reception of the error message, the error message is displayed on the LCD 12 (step 167).

Figure 12:
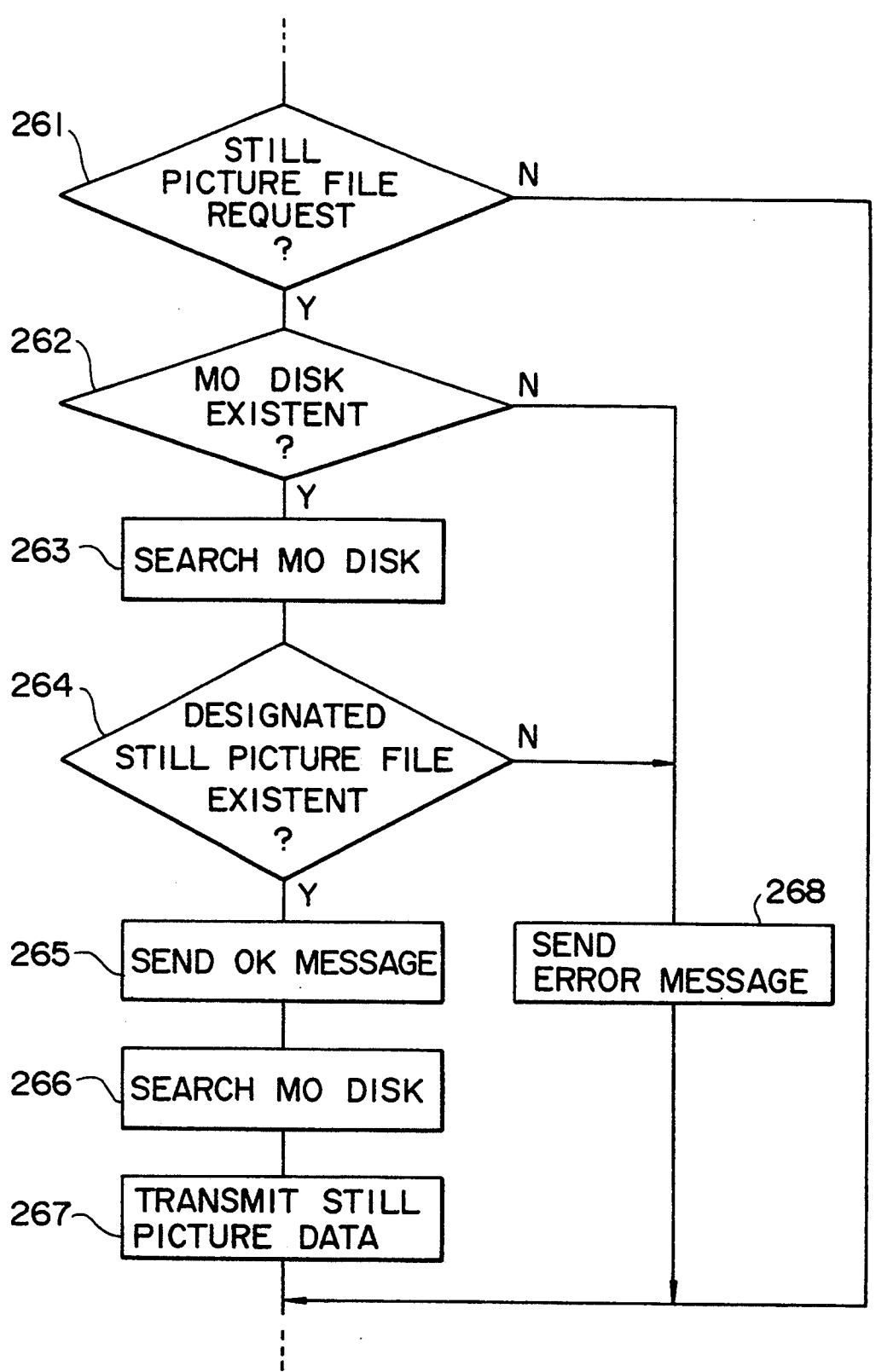
FIG. 12 is a flow chart for explaining the operation of the stationary still picture transmitter in the still picture transmitting system of FIG. 1.

FIG. 12 is a flow chart for explaining the operation of the second transmitter 2 performed at the time of request a desired still picture file by the first transmitter 1.

First a decision is made as to whether a request for any still picture file has been received or not from the transmitter 1 (step 261). If the result of such decision is affirmative to signify reception of the request, another decision is made as to whether any MO disk is present or not in the magneto-optical disk unit 4 (step 262). In case the magneto-optical disk unit 4 is not connected, the result signifies nonexistence of any MO disk.

When there exists a MO disk, the MO disk is searched for retrieval under control of the CPU 201 (step 263). In this case, an area "DIRECTORY ENTRY" of the MO disk is searched. (The record content on the MO disk is shown in FIG. 8.)

Next a decision is made as to whether the designated still picture file is present or not on the MO disk (step 264). And if the result of such search of the MO disk signifies the existence of the designated still picture file, an OK message is sent from the CPU 201 to the transmitter 1 via the system bus 202, the internal modem interface 2.11 and the internal modem 212 (step 265).

Subsequently the designated still picture file is retrieved with reference to the area "FAT" of the MO disk (shown in FIG. 8) (step 266). And the still picture data contained in the designated still picture file read out from the MO disk is sent to the first transmitter 1 via the SCSI controller 208, the system bus 202, the internal modem interface 211 and the internal modem 212 (step 267).

In case the result of the decision at step 262 or 264 signifies nonexistence of any MO disk or the designated still picture file, an error message is sent from the CPU 201 to the first transmitter 1 via the system bus 202, the internal modem interface 211 and the internal modem 212 (step 268).

Figure 13:
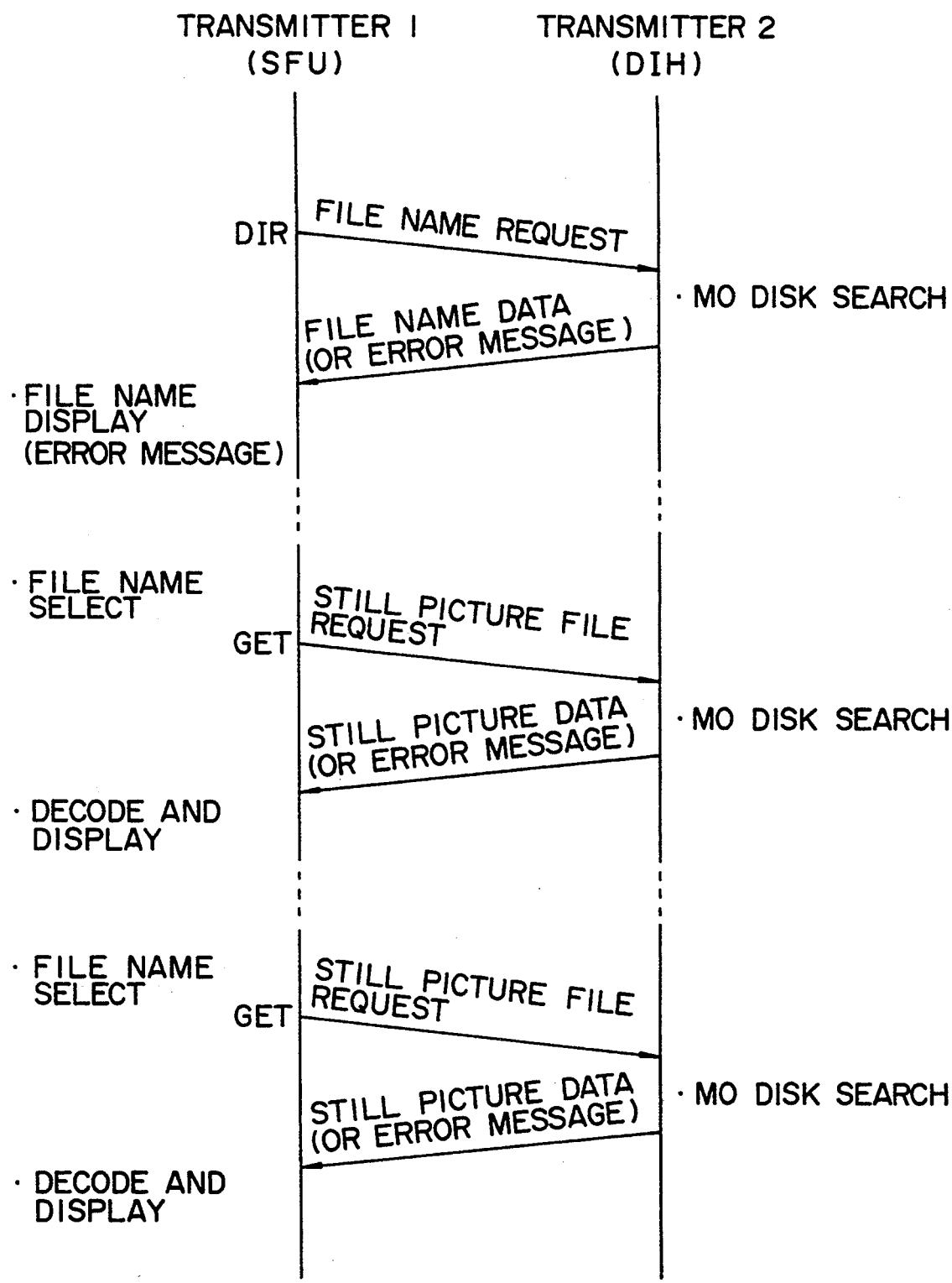
FIG. 13 shows a sequence of signals in the still picture transmitting system of FIG. 1.

FIG. 13 shows a sequence of signals between the transmitters 1 and 2 at the time of a file name request and a still picture file request. In response to the file name request received from the transmitter 1, the transmitter 2 sends the file name data or the error message to the transmitter 1. And the file name or the error message is displayed on the LCD 12.

In response to the still picture file request sent to the second transmitter 2 from the first transmitter 1 after selection of a desired file name, the second transmitter 2 sends the still picture data or the error message to the first transmitter 1. Then the still picture data is decoded, and the corresponding still picture is displayed on the monitor 1c, or the error message is displayed on the LCD 12.

After reception of the file name as described, the first transmitter 1 in this embodiment is capable of sequentially receiving the still picture files all of the file names in the following procedure.

Figure 14:
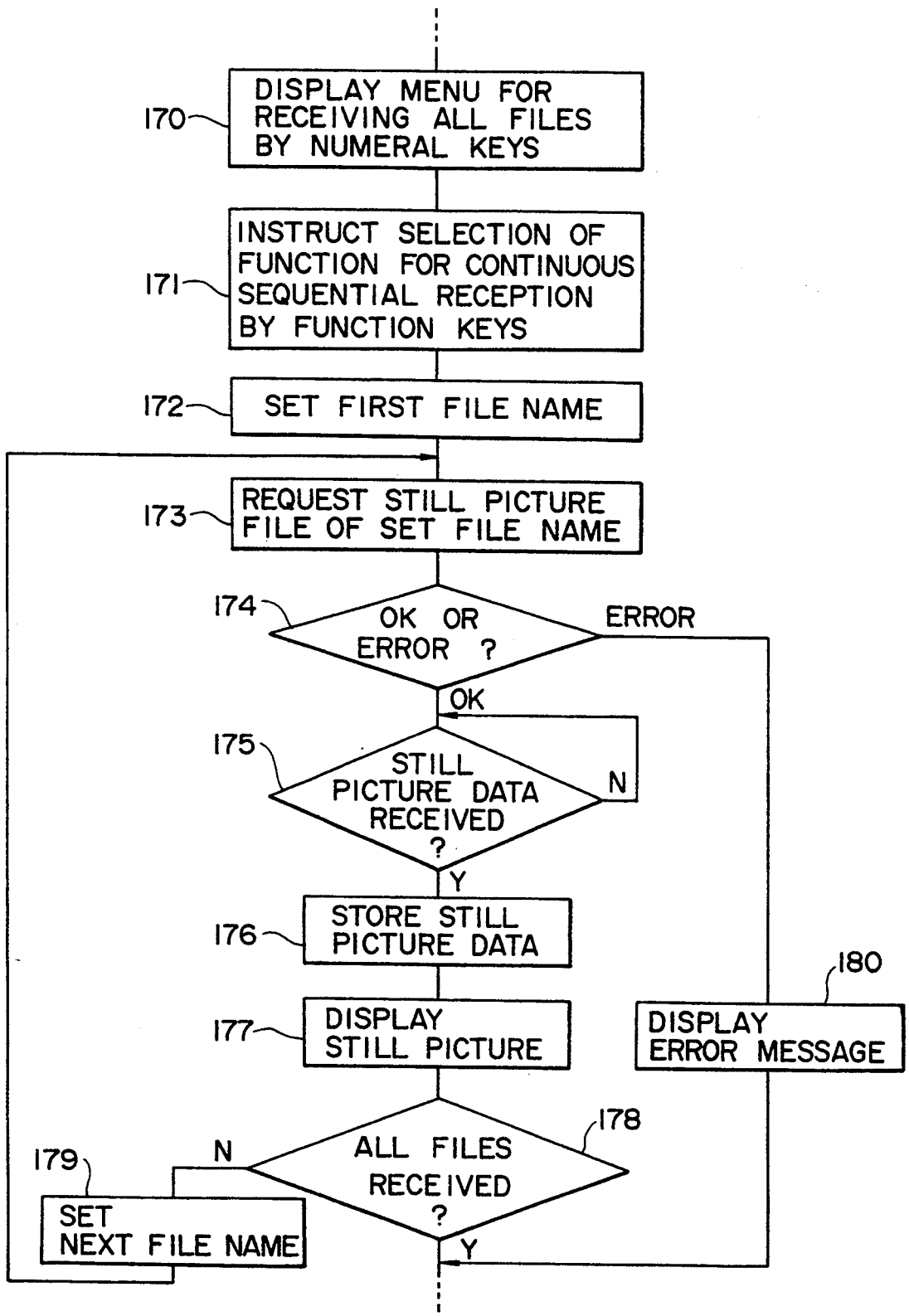
FIG. 14 is a flow chart for explaining the operation of the portable still picture transmitter in the still picture transmitting system of FIG. 1.

FIG. 14 is a flow chart for explaining the operation of the first transmitter 1 performed at the time of requesting all of the still picture files.

First, a menu for receiving all the still picture files is displayed on the LCD 12 by depressing the keys "5", "8", "2" and "0" of the numeral keys 14 (shown in FIG. 2) as described above (step 170). FIG. 15 shows exemplary display contents on the LCD 12.

Subsequently the function key 13 is depressed to instruct selection of a function for continuous sequential reception (step 171). In this case, the right-end one of the function keys 13 is successively depressed until "GET" is displayed on the LCD 12 (as shown in FIG. 15). And then one of the function keys 13 corresponding to "GET" is depressed in the above state.

In response to such instruction input for selection of the function for continuous sequential reception, the first file name is set initially (step 172). And a still picture file request relative to the set file name is sent from the CPU 101 of the first transmitter 1 to the second transmitter 2 via the system bus 102 and the internal modem 111 (step 173).

Next a decision is made as to which of an OK message or an error message has been received (step 174). And if the result of such decision signifies reception of the OK message, another decision is made as to whether the still picture data has been received or not (step 175).

If the result at step 175 is affirmative to signify reception of the still picture data, the still picture data is stored in the work RAM 104 (step 176). Then the still picture data is written in the frame memory 108 after being decoded (expanded) by the DSP 107, and the still picture represented by the received still picture file is displayed on the monitor 1c (step 177).

Subsequently a decision is made as to whether all still picture files corresponding to the received file names have been received or not (step 178). If the result of such decision is negative to signify no reception of all still picture files, the next file name is set (step 179), and the process returns to step 173. In the case of reception of all still picture files, the operation for receiving the still picture files is completed.

When the result at step 174 signifies reception of the error message, the error message is displayed on the LCD 12 (step 180), and the operation for receiving the still picture files is completed.

The operation of the second transmitter 2 at the time of requesting all still picture files from the first transmitter 1 is similar to the one described in connection with FIG. 12, so that a repeated explanation thereof is omitted here.

Figure 16:
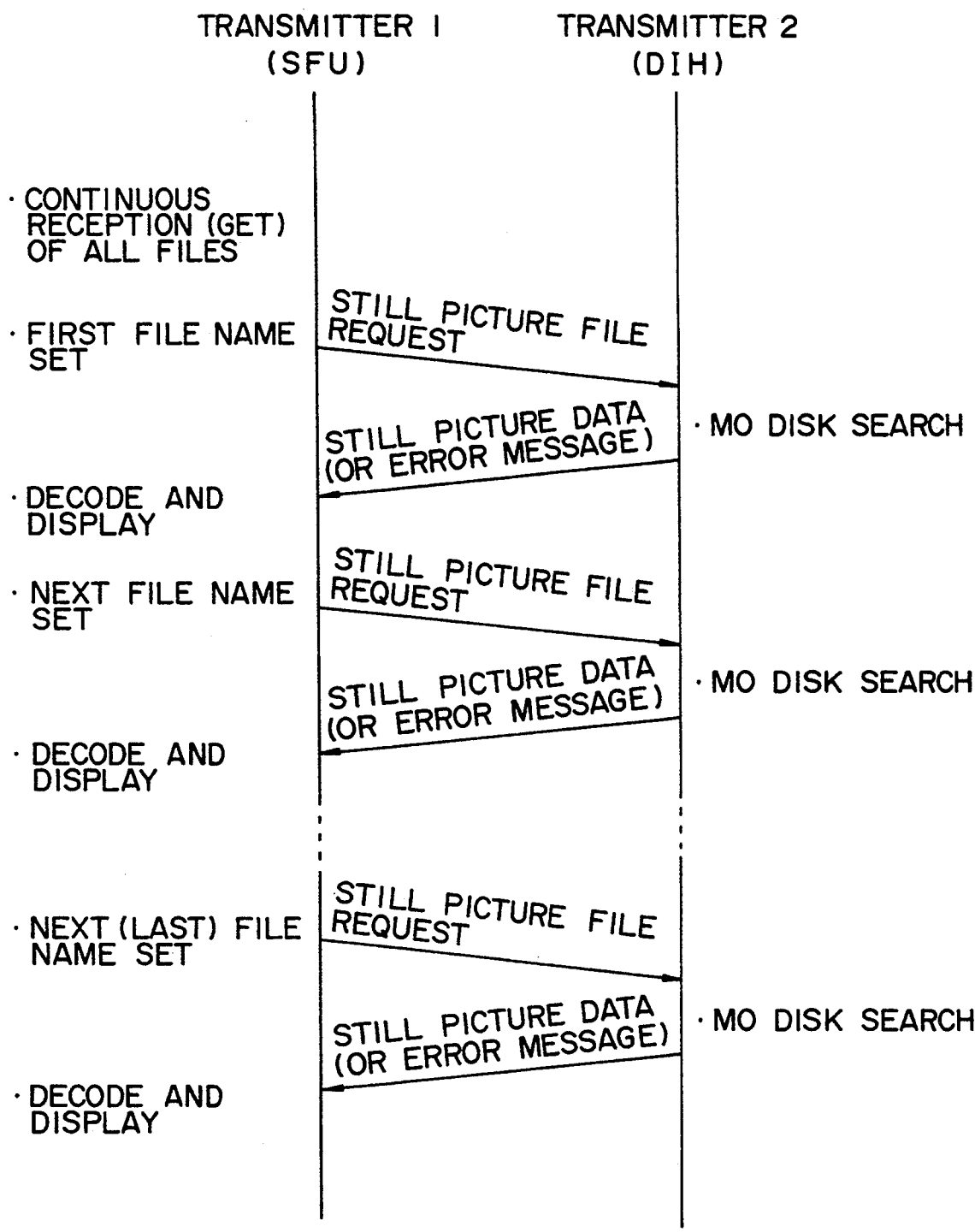
FIG. 16 shows a sequence of signals in the still picture transmitting system of FIG. 1.

FIG. 16 shows a sequence of signals between the two transmitters 1 and 2 at the time of a request for all still picture files. Upon instruction for continuous sequential reception of all still picture files corresponding to the input file names received in the first transmitter 1, the first file name is set initially, and a still picture file request is sent from the first transmitter 1 to the second transmitter 2. Then the still picture data corresponding thereto or the error message is sent from the second transmitter 2 to the first transmitter 1.

Thereafter the file names are set sequentially and automatically until the final one, and a still picture file request is sent from the first transmitter 1 to the second transmitter 2. Then the still picture data corresponding thereto or the error message is sent from the second transmitter 2 to the first transmitter 1.

After reception of the file names as mentioned above, the first transmitter 1 in this embodiment is capable of continuously receiving the still picture files of the designated file names in sequence according to the following procedure.

Figure 17:
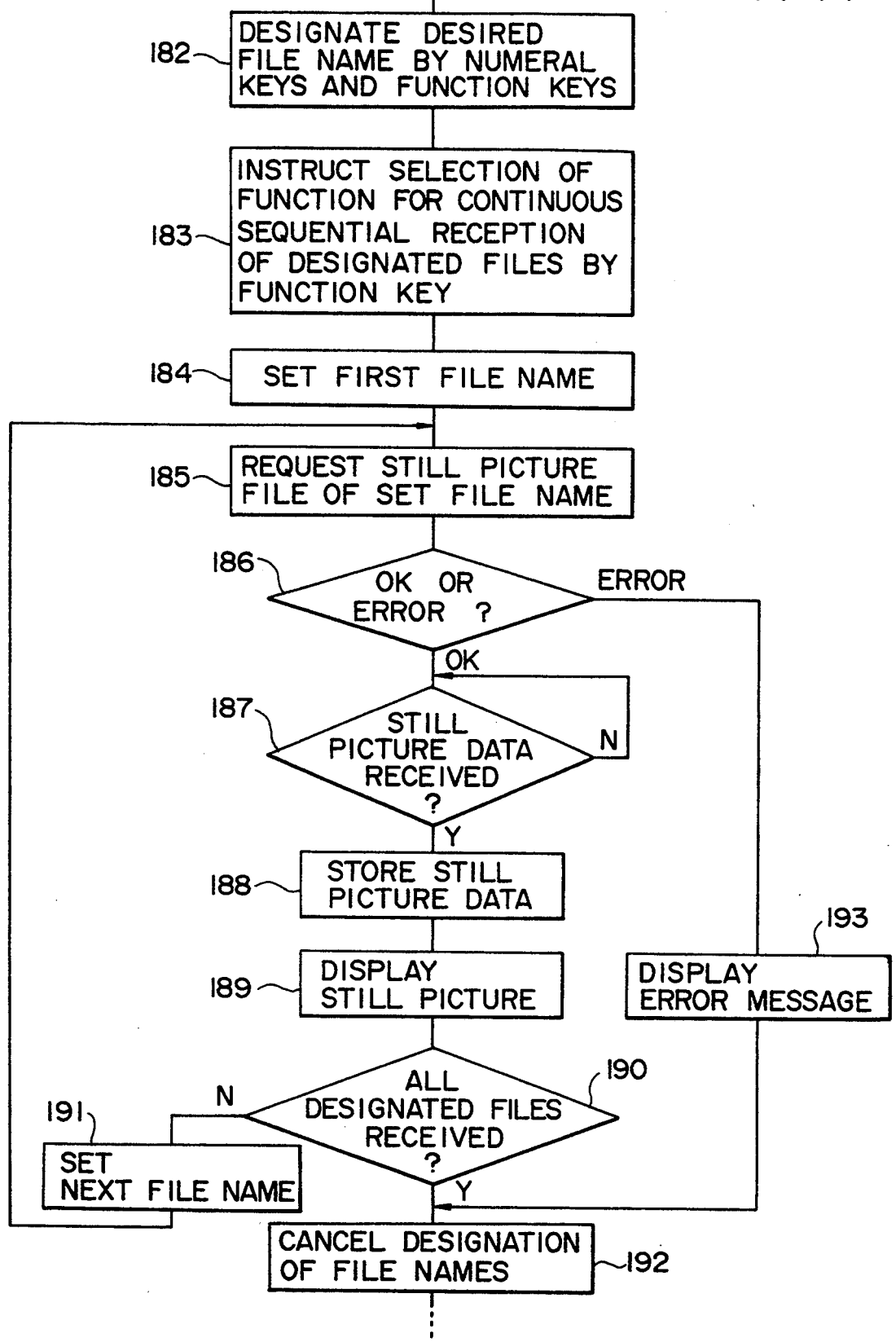
FIG. 17 is a flow chart for explaining the operation of the portable still picture transmitter in the still picture transmitting system of FIG. 1.

FIG. 17 is a flow chart showing the operation of the first transmitter 1 at the time of a request for designated still picture files.

Figure 18A:
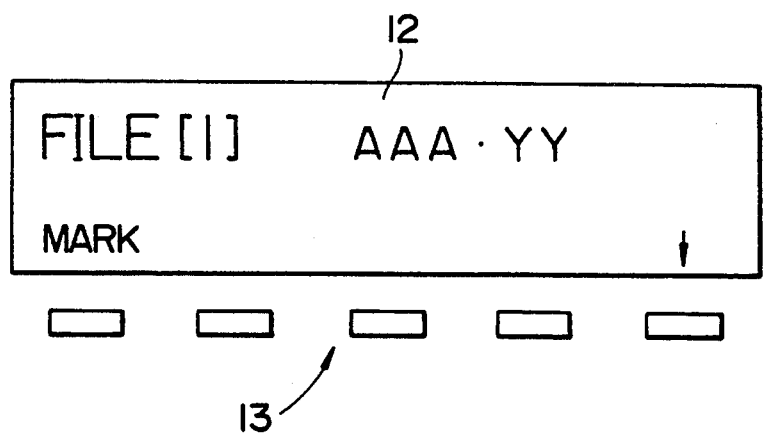
FIGS. 18A and 18B schematically show exemplary display contents on the LCD of the portable still picture transmitter in the still picture transmitting system of FIG. 1.
Figure 18B:
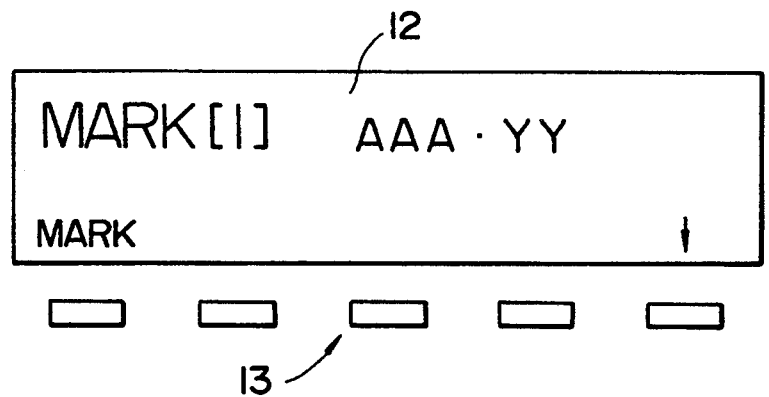

First the name of a desired still picture file to be received is displayed on the LCD 12 by manipulating the keys "5", "8", "2" and "0" out of the numeral keys 14 (shown in FIG. 2) as described, and then the file name is designated by manipulating the function key 13 (step 182). In this case, the right-end one of the function keys 13 is depressed successively until "MARK" is displayed on the LCD 12 (as shown in the example of FIG. 18A), and then one of the function keys 13 corresponding to "MARK" is depressed. FIG. 18B shows exemplary display contents on the LCD 12 obtained after designation of the file name by depression of the key corresponding to "MARK", wherein the portion "FILE" is changed to "MARK". Even after the file name is designated, such designation can be canceled by depressing again the key for "MARK" (as shown in FIG. 18A). Thereafter a plurality of file names can be designated by executing the same manipulation of the keys.

Subsequently one of the function keys 13 is manipulated to instruct selection of a function for continuous sequential reception (step 183). In this case, the right-end one of the function keys 13 is successively depressed until "GET" is displayed on the LCD 12 (as shown in FIG. 15). And then one of the function keys 13 corresponding to "GET" is depressed in the above state where one of the file names with "MARK" is displayed on the LCD 12. If the key corresponding to "GET" is depressed while the file name with "FILE" instead of "MARK" is displayed on the LCD 12, the operation of FIG. 11 is performed.

In response to such instruction input by the user to select the function for continuous sequential reception, the first file name is set initially out of the plural designated file names (step 184). And a still picture file request relative to the set file name is sent from the CPU 101 of the first transmitter 1 to the second transmitter 2 via the system bus 102 and the internal modem 111 (step 185).

Next a decision is made as to which of an OK message and an error message has been received (step 186). And if the result of such decision signifies reception of the OK message, another decision is made as to whether the still picture data has been received or not (step 187).

If the result at step 187 is affirmative to signify reception of the still picture data, the still picture data is stored in the work RAM 104 (step 188). Then the still picture data is written in the frame memory 108 after being decoded (expanded) by the DSP 107, and the still picture represented by the received still picture file is displayed on the monitor 1c (step 189).

Subsequently a decision is made as to whether all still picture files corresponding to the designated file names have been received or not (step 190). If the result of such decision is negative to signify no reception of all designated still picture files, the next file name is set (step 191), and the process returns to step 185. In case the all designated still picture files have been received, the designation of the file names is canceled (step 192), and the operation for receiving the still picture files is completed.

When the result at step 186 signifies reception of the error message, the error message is displayed on the LCD 12 (step 193) and, after the designation of the file names is canceled (step 192), the operation for receiving the still picture files is completed.

The operation of the second transmitter 2 at the time of requesting all still picture files of the designated file names from the first transmitter 1 is similar to the one described in connection with FIG. 12, so that a repeated explanation thereof is omitted here.

Figure 19:
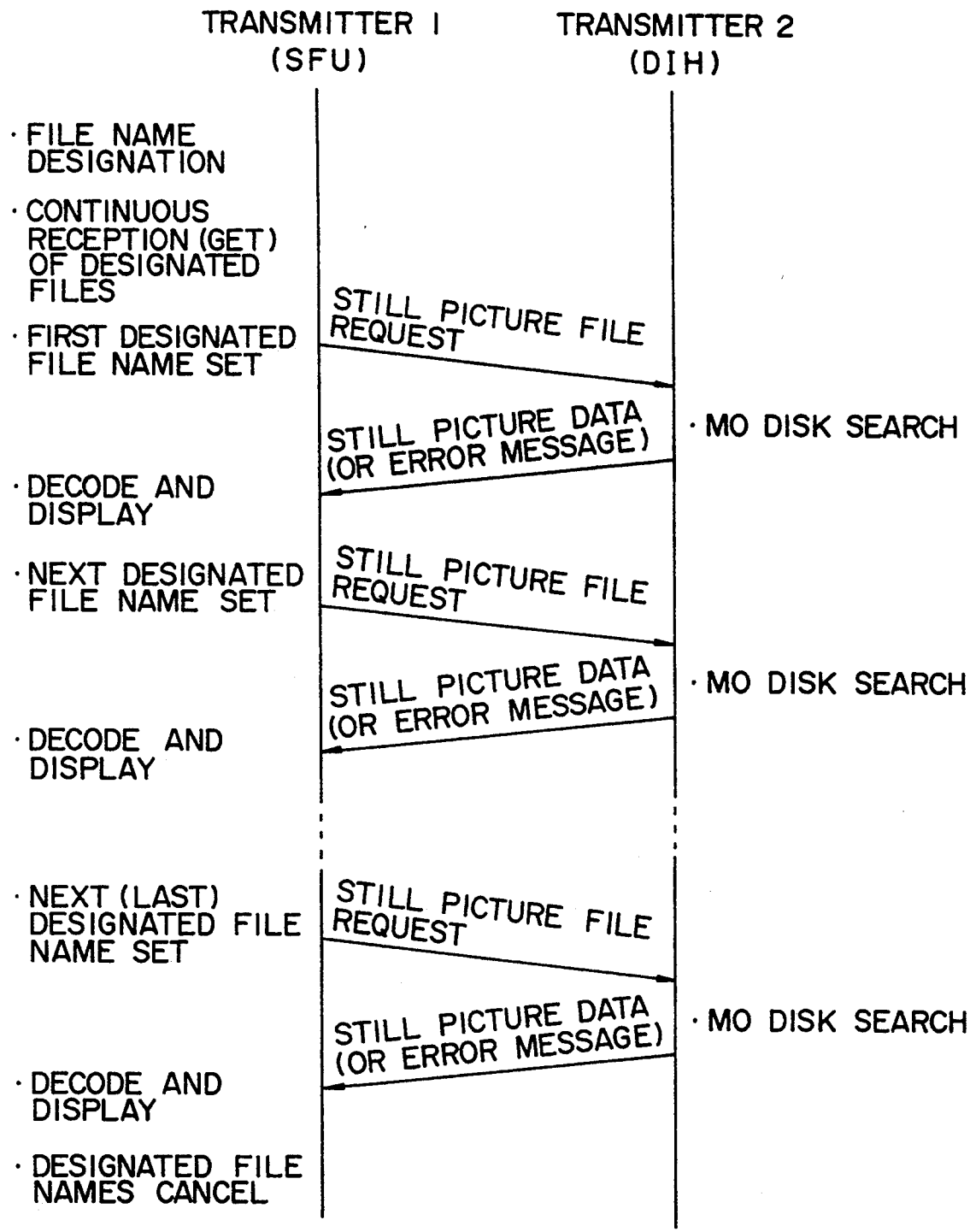
FIG. 19 shows a sequence of signals in the still picture transmitting system of FIG. 1.

FIG. 19 shows a sequence of signals between the two transmitters 1 and 2 at the time of a request for all designated still picture files. Upon instruction input for continuous reception of the all still picture files of designated file names in the first transmitter 1, the first file name is set initially, and a still picture file request is sent from the first transmitter 1 to the second transmitter 2. Then the still picture data corresponding thereto or the error message is sent from the second transmitter 2 to the first transmitter 1.

Thereafter the file names are set sequentially and automatically until the final one, and a still picture file request is sent from the first transmitter 1 to the second transmitter 2. Then the still picture data corresonding thereto or the error message is sent from the second transmitter 2 to the first transmitter 1.

Thus, the first transmitter 1 in this embodiment is capable of receiving the file name data of the still picture files recorded on the MO disk in the magneto-optical disk unit 4 connected to the second transmitter 2, whereby the file names can be detected in the first transmitter 1.

After reception of the file names in the first transmitter 1, when one of the function keys 13 for "GET" is depressed in the state where the file name of the desired still picture file to be received is displayed on the LCD 12 by the numeral keys 14, then the still picture file of the name displayed on the LCD 12 can be received from the second transmitter 2 (magneto-optical disk unit 4). Therefore it becomes possible to receive the desired still picture file merely by simple manipulation of the keys without the necessity of any intricate manipulation such as typing in the file name.

Also after reception of the file names in the first transmitter 1, the still picture files of the names obtained from the second transmitter 2 (magneto-optical disk unit 4) can be received in sequence continuously when one of the function keys 13 for "GET" is depressed in the state where a menu for receiving the all files is displayed on the LCD 12 by the numeral keys 14. Therefore, it becomes possible to achieve continuous reception of all still picture files of the received file names by simple manipulation of the keys without the necessity of typing in the file names one by one or inputting an instruction for the receiving manipulation. In this case, still picture files of the same kind alone are sequentially receivable if merely the file names of the same genre can be previously received.

In addition, after reception of the file names in the first transmitter 1, it is possible to realize sequential continuous reception of all still picture files of the designated file names from the second transmitter 2 (magneto-optical disk unit 4) merely by depressing one of the function keys 13 for "GET" in the state where the desired file names to be received are designated by the function keys 13. Consequently, the file names can be designated by simple manipulation of the keys and further the entirety of the designated still picture files are receivable continuously without the necessity of typing in the file names one by one or inputting an instruction for the receiving manipulation.

In the embodiment described above, the magneto-optical disk unit 4 is employed as a file unit connected to the stationary still picture transmitter 2. However, it is to be understood that the present invention is similarly applicable to some other constitution where the file unit is replaced with an optical disk unit, a magnetic disk unit or the like.

According to the present invention, as mentioned hereinabove, the first still picture transmitter (of portable type) is rendered capable of detecting the names of still picture files stored in the file unit of the second still picture transmitter (of stationary type), whereby the operational convenience and facility of the first still picture transmitter can be remarkably enhanced.

Further in this embodiment, it is also possible to send a request from the first transmitter 1 to the second transmitter 2 for a desired file name with condition instead of the entirety of the still picture files recorded on the MO disk in the magneto-optical disk unit 4.

Figure 20:
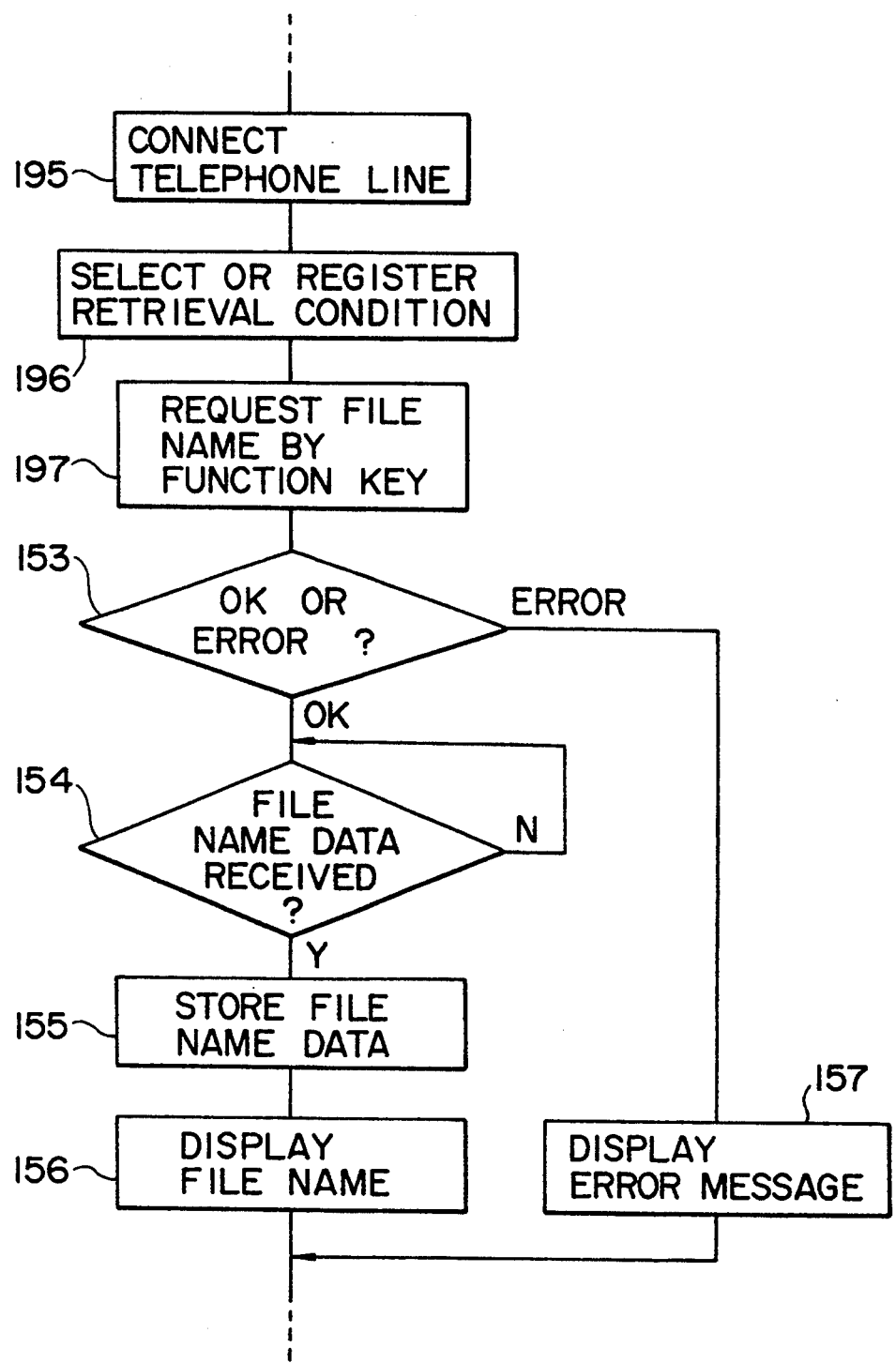
FIG. 20 is a flow chart for explaining the operation of the portable still picture transmitter in the still picture transmitting system of FIG. 1.

FIG. 20 is a flow chart for explaining the operation of the first transmitter 1 at the time of requesting a file name with condition.

First the telephone line is connected to the second transmitter 2 by using the numeral keys 14 (shown in FIG. 2) (step 195).

Then, retrieval condition is selected (or registered if not yet registered) by using the numeral keys 14 and the function keys 13 (shown in FIG. 2) (step 196).

Figure 21A:
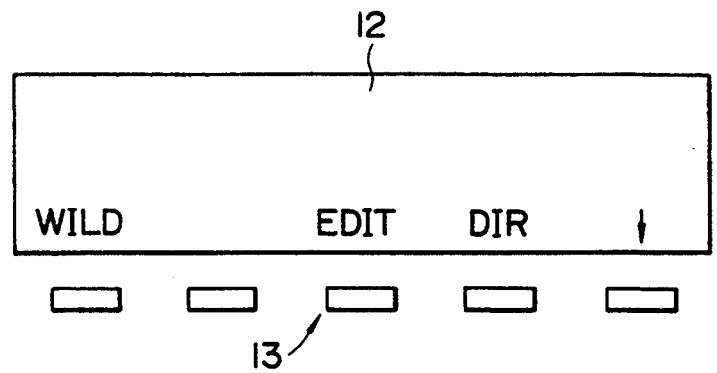
FIGS. 21A, 21B, 21C, and 21D schematically show exemplary display contents on the LCD of the portable still picture transmitter in the still picture transmitting system of FIG. 1.

Registration of the retrieval condition is performed in the following manner. First, the right-end one of the function keys 13 (corresponding to " ↓ " displayed on the LCD 12) is successively depressed until "WILD" is displayed on the LCD 12 (as illustrated in FIG. 21A). And when one of the function keys 13 for "WILD" is depressed, an image representing the retrieval condition is displayed on the LCD 12.

Figure 21B:
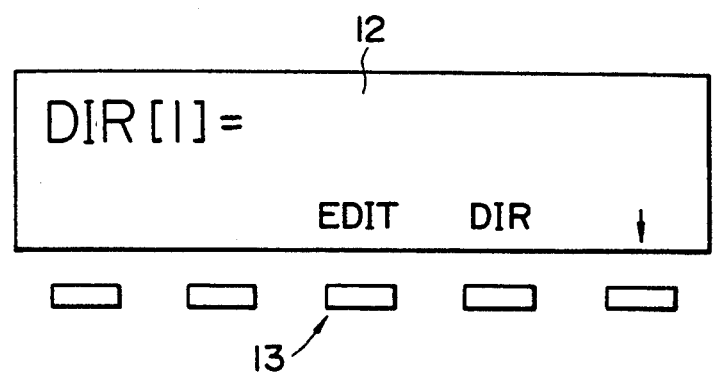

As an image representative of the retrieval condition, any of ten images from DIR [1] to DIR [10] can be selected by depressing "5" or "8" of the numeral keys 14. (FIG. 21B illustrates an image of DIR [1] to be registered.) The next image is selected by depressing the key "5", or the preceding image is selected by depressing the key "8".

In the state where each image is displayed, the retrieval conditions can be registered in DIR [1] to DIR [10] respectively. In this embodiment, therefore, it is possible to register a total of ten retrieval conditions. In case the retrieval conditions have already been registered in advance, such conditions are displayed correspondingly to the individual images.

Figure 21C:
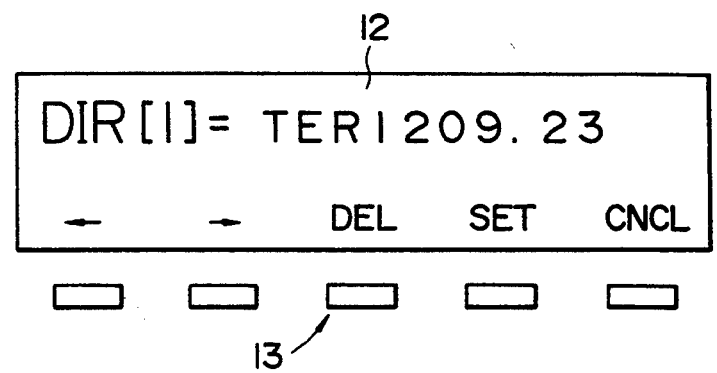

After one of DIR [1] to DIR [10] is selected by depressing the key "5" or "8" the right-end one of the function keys 13 is depressed successively until "EDIT" is displayed on the LCD 12 (as illustrated in FIG. 21B). And the apparatus is placed in a character input mode by depressing one function key 13 for "EDIT" In this case, "←" "→" "DEL" "SET" "CNCL" are displayed on the LCD 12 correspondingly to the individual function keys 13 (as illustrated in FIG. 21C).

Figure 22:
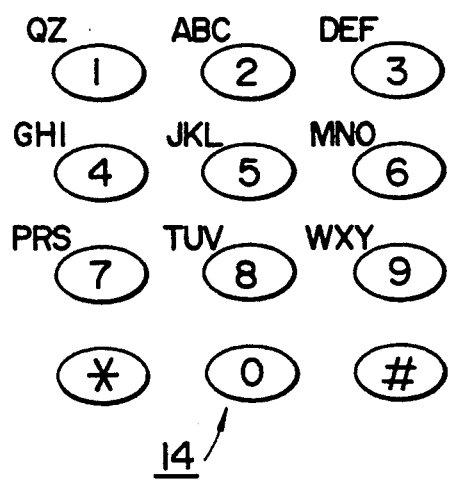
FIG. 22 schematically shows a keyboard of the portable still picture transmitter in the still picture transmitting system of FIG. 1.

In the character input mode, the retrieval condition is input by manipulating the numeral keys 14. In this case, alphabetic letters are allocated to "1" through "9" of the numeral keys 14 respectively as illustrated in FIG. 22. Although not shown in FIG. 2, alphabetic letters allocated to the individual keys are printed on the control panel or the keys themselves.

Every depression of each key changes the input character cyclically from key-top character→uppercase of 1st character in character row on keys→uppercase of 2nd character in character row on keys→. . . →uppercase of last character in character row on keys→lowercase of 1st character in character row on keys→lowercase of 2nd character in character row on keys→ . . . lower case of last character in character row on keys→ key-top character.

For example, when the key "2" is depressed, the input character is sequentially changed as [2]→[A]→[B]→[C]→[a]→[b]→[c]→[2].

Figure 23:
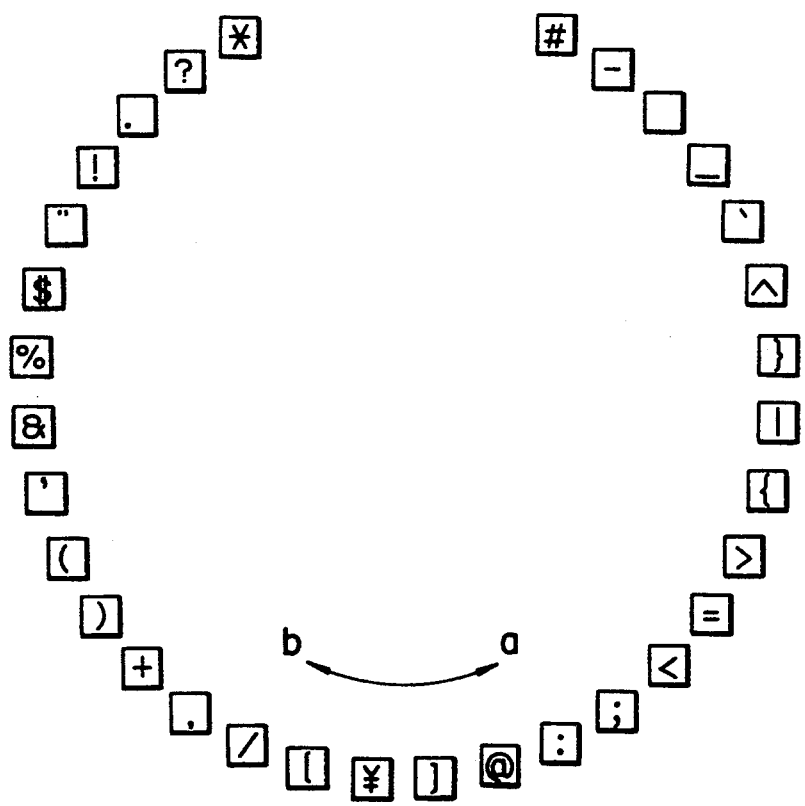
FIG. 23 is a schematic diagram for explaining how symbols are input from the keyboard of the portable still picture transmitter in the still picture transmitting system of FIG. 1.

Symbols are input by using "*" and "#" of the numeral keys 14. For example, every depression of the key "*" changes the input symbol sequentially as [*]→[?]→[.]→[!]→and so forth in the direction a (counterclockwise) of the circular symbol arrangement shown in FIG. 23. Meanwhile, each depression of the key "#" changes the input symbol sequentially as [#]→[−]→[]→[]→ and so forth in the direction b (clockwise) of the circular symbol arrangement shown in FIG. 23. If the key "#" is depressed immediately after depression of the key "*" the input symbol is changed backward to the adjacent one in the direction b. Meanwhile, if the key "*" is depressed immediately after depression of the key "#", the input symbol is changed backward to the adjacent one in the direction a.

Figure 24A:
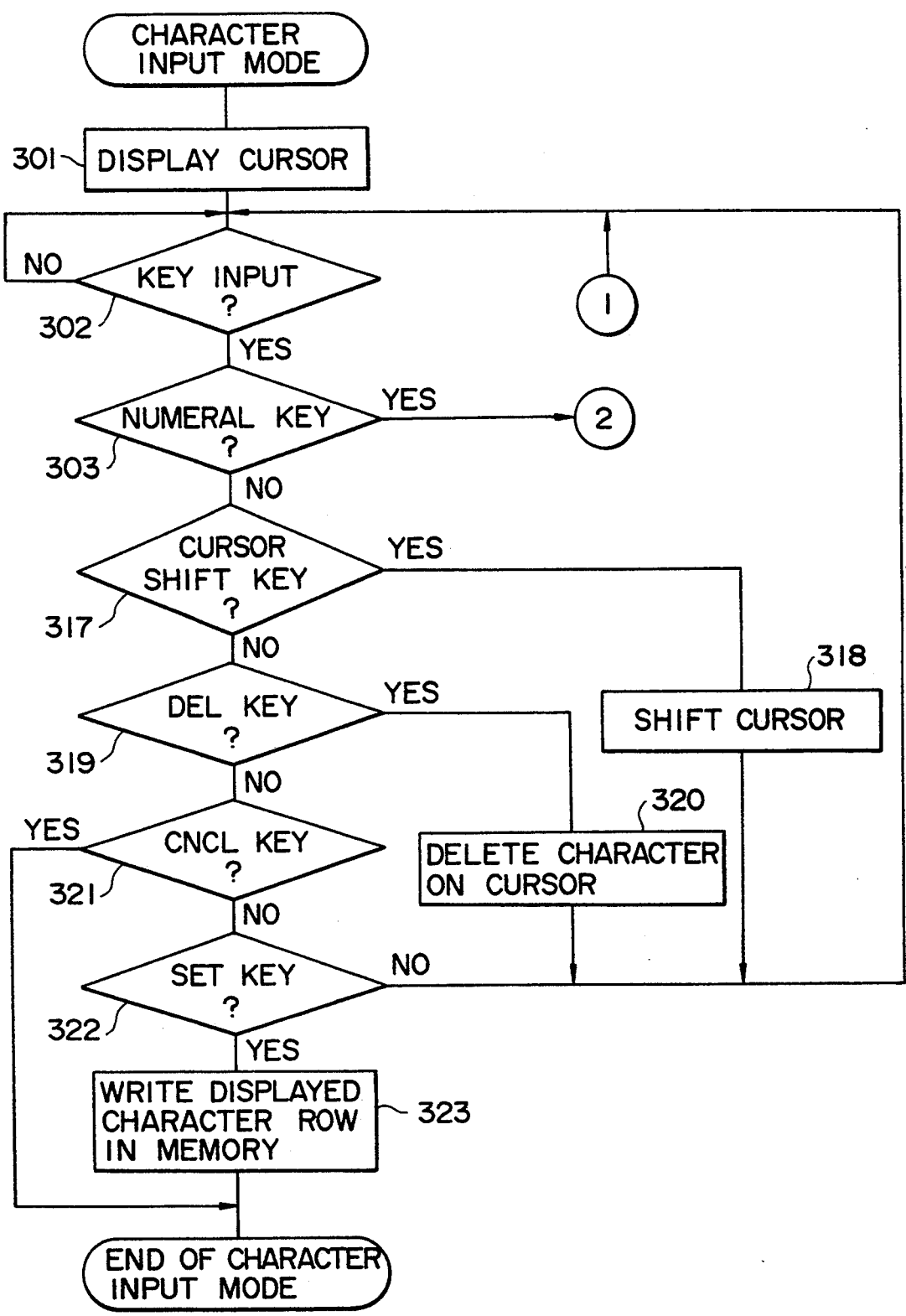

FIGS. 24A and 24B are flow charts for explaining the character input operation performed in the character input mode. When the apparatus is placed in the character input mode, a cursor (not shown) is displayed on the LCD 12 correspondingly to the character input position (step 301). Subsequently a decision is made as to whether any key input is existent or not (step 302). When the result of such decision is affirmative to signify the existence of a key input, another decision is made as to whether the input is from any numeral key 14 (step 303). In the case of a numeral key 14, a decision is made as to whether it is a first key input or not (step 304), and if the result of the decision is negative, another decision is made as to whether the input is immediately after a cursor shift key (step 305). When the result is negative, a further decision is made as to whether it is immediately after a DEL key (corresponding to the displayed "DEL" out of the function keys 13) (step 306).

When the result at step 304, step 305 or step 306 signifies the input from the first key, the input immediately after the cursor shift key, or the input immediately after the DEL key, the first character allocated to that key is displayed as an input candidate character at the cursor position (step 307), and then the process returns to step 302.

In this case, a code signal corresponding to the depressed key is output from the CPU 101 and then is supplied via the display interface 113 to the LCD 12, so that the character is displayed at the cursor position. The same operation is performed thereafter.

If the result of the decision at step 306 signifies the input not immediately after the DEL key, another decision is made as to whether the input is derived from successive depression of the same key (step 308). And if the result is affirmative, a further decision is made as to whether it is derived from successive depression of the # key (step 309). When the result is affirmative, the next symbol in the direction b (shown in FIG. 23) is displayed as an input candidate character at the cursor position (step 310), and then the process returns to step 302.

If the result at step 309 is negative to signify no successive depression of the # key, a decision is made as to whether the input is derived from successive depression of the * key or not (step 311). And if the result is affirmative, the next symbol in the direction a (shown in FIG. 23) is displayed as an input candidate character at the cursor position (step 312), and then the process returns to step 302.

In case the result at step 311 is negative to signify no successive depression of the * key, the next character allocated thereto is displayed as an input candidate character at the cursor position (step 313), and the process returns to step 302.

When the result at step 308 is negative to signify no successive depression of the same key, a decision is made as to whether it is derived from the * key which is immediately after the # key (step 314). And if the result is affirmative, the next symbol in the direction a (shown in FIG. 23) is displayed as an input candidate character at the cursor position (step 312), and the process returns to step 302.

When the result at step 314 is negative to signify no depression of the * key immediately after the 190 key, a decision is made as to whether the input is derived from the # key immediately after the * key (step 315). And if the result is affirmative, the next symbol in the direction b (shown in FIG. 23) is displayed as an input candidate character at the cursor position (step 310), and then the process returns to step 302.

In case the result at step 315 is negative to signify no depression of the # key immediately after the * key, the cursor position is shifted by 1 rightward (step 316), and the first character allocated to that key is displayed as an input candidate character at the cursor position (step 307). Thereafter the process returns to step 302.

When the result at step 303 is negative to signify no input from any numeral key 14, a decision is made as to whether the input is from the cursor shift key (one of the function keys 13 for displaying "←" or "→") (step 317). If the result of this decision is affirmative, the cursor position is shifted by 1 in the corresponding direction (step 318), and the process returns to step 302.

In case the result at step 317 is negative to signify no input from the cursor shift key, another decision is made as to whether the input is from the DEL key or not (step 319). And if the result is affirmative, the character on the cursor is deleted (step 320), and the process returns to step 302.

When the result at step 319 is negative to signify no input from the DEL key, a decision is made as to whether the input is from the CNCL key (one of the function keys 13 for displaying "CNCL"). And if the result of this decision is affirmative, all the characters inputted up to that step are canceled, and the character input mode is completed. In this stage, the display contents on the LCD 12 revert to those prior to the character input mode (as shown in FIG. 21B).

If the result at step 321 is negative to signify no input from the CNCL key, another decision is made as to whether the input is from the SET key (one of the function keys 13 for displaying "SET") (step 322), and the process returns to step 302 in case the result is negative.

Figure 21D:
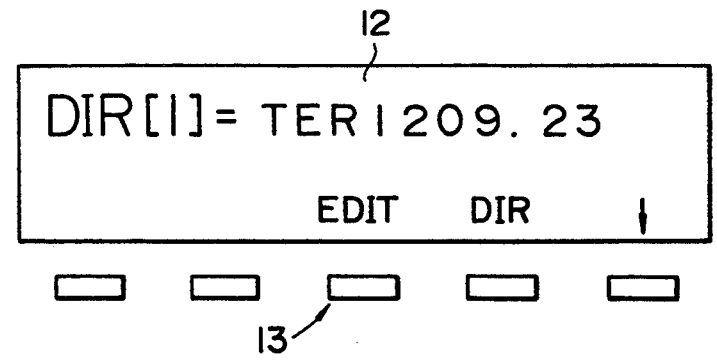

When the result at step 322 is affirmative to signify the input from the SET key, the character row being displayed is written in the memory (work RAM 104) so as to be registered (step 323), and thus the character input mode is completed. In this case, the display content of FIG. 21C on the LCD 12 prior to depression of the SET key is changed to the display content of FIG. 21D on the LCD 12 after depression of the SET key, indicating that the retrieval condition of TER1209.23 has been registered in DIR [1].

The following are exemplary contents of retrieval conditions to be registered.

DIR [1] = TER1209.23

DIR [2] = *

DIR [3] = ????

DIR [4] = TE*

DIR [5] = T????209.23

In the above, DIR [1] stands for a file name of TER1209.23; DIR [2] for all file names; DIR [3] for all file names of 4 characters; DIR [4] for all file names where the first two characters are TE (TE, TE72, TERM3456, TER1209.23, etc.); and DIR [5] stands for all file names where the first character is T and the fifth and ensuing characters are 209.23.

The symbols [*] and [?] are special characters used for retrieval conditions. The symbol [*] corresponds to a character row composed of 0 or more characters, and [?] corresponds to a single-character expression.

The retrieval conditions stored in the work RAM 104 as mentioned above are preserved in the backup RAM 112 when the power supply is switched off.

Figure 25A:
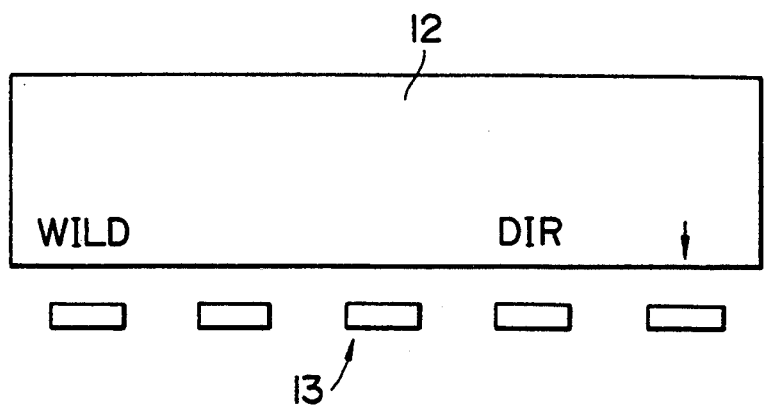
FIGS. 25A and 25B schematically show exemplary display contents on the LCD of the portable still picture transmitter in the still picture transmitting system of FIG. 1.
Figure 25B:
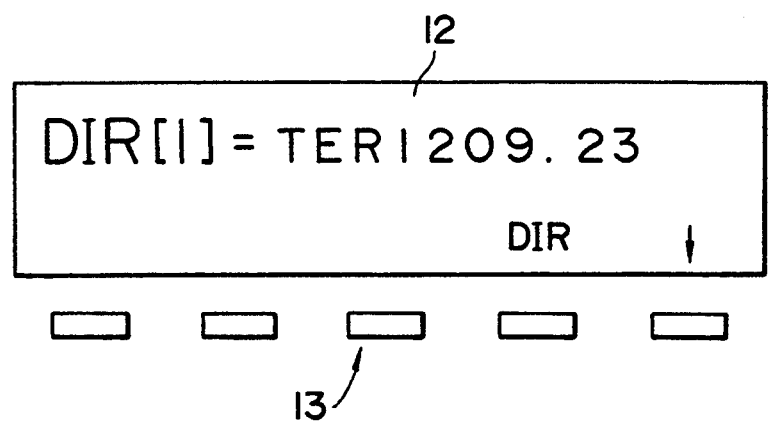

Selection of the retrieval condition at step 196 in FIG. 20 is performed in the following manner. Similarly to the procedure for registration of the retrieval condition, the right-end one of the function keys 13 is successively depressed until "WILD" is displayed on the LCD 12 (as shown in FIG. 25A). And when one of the function keys 13 for "WILD" is depressed, an image representing the retrieval condition is displayed on the LCD 12. Then the desired retrieval condition is selected out of DIR [1] to DIR [10] by depressing "5" and "8" of the numeral keys 14 (as shown in FIG. 25B). In case the retrieval condition has not been registered in advance, it needs to be registered in the manner described above.

Referring back to FIG. 20, a request for a desired file name is output by manipulating the function key 13 after selection of the retrieval condition at step 196 (step 197). In this case, the right-end one of the function keys 13 is successively depressed until "DIR" is displayed on the LCD 12 (as shown in FIG. 25B). When one of the function keys 13 corresponding to "DIR" is depressed in such a state, a file name request is sent from the CPU 101 of the first transmitter 1 via the system bus 102 and the internal modem 111 to the second transmitter 2. The file name request is accompanied with the retrieval condition selected at step 196.

Since the ensuing steps are the same as those in FIG. 6, a repeated explanation thereof is omitted here.

The operation of the second transmitter 2 is the same as that shown in the flow chart of FIG. 7 with the exception of the data retrieval on the MO disk. More specifically, when the file name request is the one accompanied with the retrieval condition added thereto at step 251 (of FIG. 7), only the file name that satisfies the retrieval condition is retrieved at step 254 (of FIG. 7) from the area "DIRECTORY ENTRY" of the MO disk. And if there exists the file name that satisfies the retrieval condition, the data of such file name is sent to the first transmitter 1 at step 255 (of FIG. 7).

Therefore, only the data of the file name satisfying the retrieval condition is received by the first transmitter 1 and then is stored in the work RAM (at step 155 in FIG. 20), and the file name satisfying the retrieval condition is displayed on the LCD 12 (at step 156 in FIG. 20). Similarly to the case of receiving all file names, the first file name alone is displayed on the LCD 12, and then other file names can also be displayed by using "5", "8", "2" and "0" of the numeral keys 14.

After reception of the file names as mentioned above, the first transmitter 1 in this embodiment is capable of receiving the still picture files of the desired file names according to the following procedure.

Figure 26:
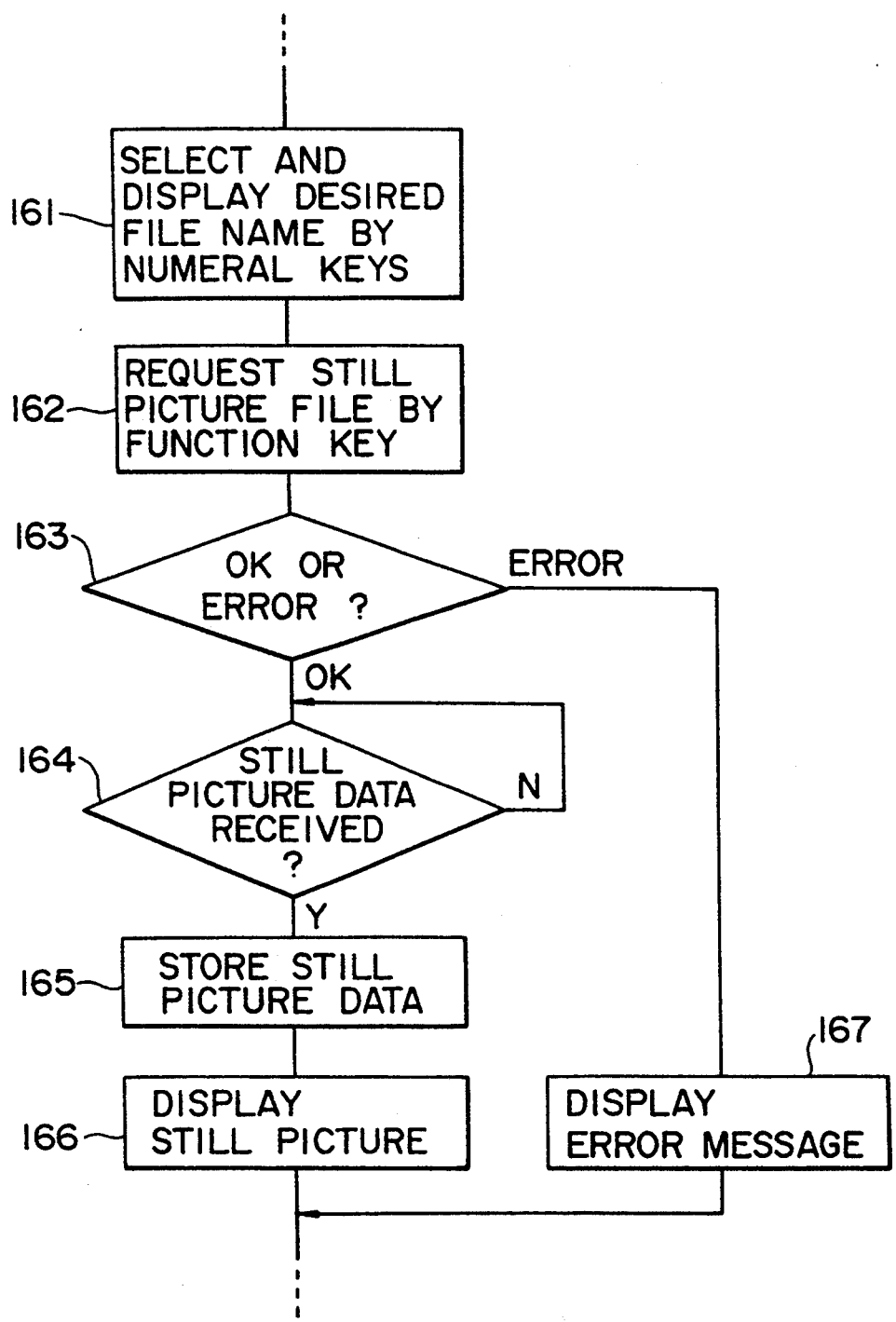
FIG. 26 is a flow chart for explaining the operation of the portable still picture transmitter in the still picture transmitting system of FIG. 1.

FIG. 26 is a flow chart for explaining the operation of the first transmitter 1 performed at the time of a request for the still picture files.

First, the name of a desired still picture file to be received is selected by using "5", "8", "2" and "0" out of the numeral keys 14 (shown in FIG. 2) as described, and then the file name is displayed on the LCD 12 (step 161).

Subsequently the still picture file is requested by using the function key 13 (step 162). In this case, the right-end one of the function keys 13 is successively depressed until "GET" is displayed on the LCD 12 (as shown in FIG. 10). Immediately after reception of the file name data in response to the file name request, "GET" is automatically displayed on the LCD 12.

In this state, when the user depresses one of the function keys 13 corresponding to "GET", the still picture file request is sent from the CPU 101 of the first transmitter 1 via the system bus 102 and the internal modem 111 to the second transmitter 2. This still picture file request is relative to the still picture file of the name displayed on the LCD 12 (i.e. the designated still picture file).

Next a decision is made as to which of an OK message and an error message has been received (step 163). And if the result of such decision signifies reception of the OK message, another decision is made as to whether the still picture data has been received or not (step 164).

If the result at step 164 is affirmative to signify reception of the still picture data, this data is stored at the work RAM 104 (step 165). Then the still picture data is written in the frame memory 108 after being decoded (expanded) by the DSP 107, and the still picture represented by the designated still picture file is displayed on the monitor 1c (step 166).

If the result at step 163 signifies reception of the error message, such error message is displayed on the LCD 12 (step 167).

The first transmitter 1 in this embodiment is capable of receiving a desired still picture file by inputting the name of such file through the use of the numeral keys 14.

Figure 27:
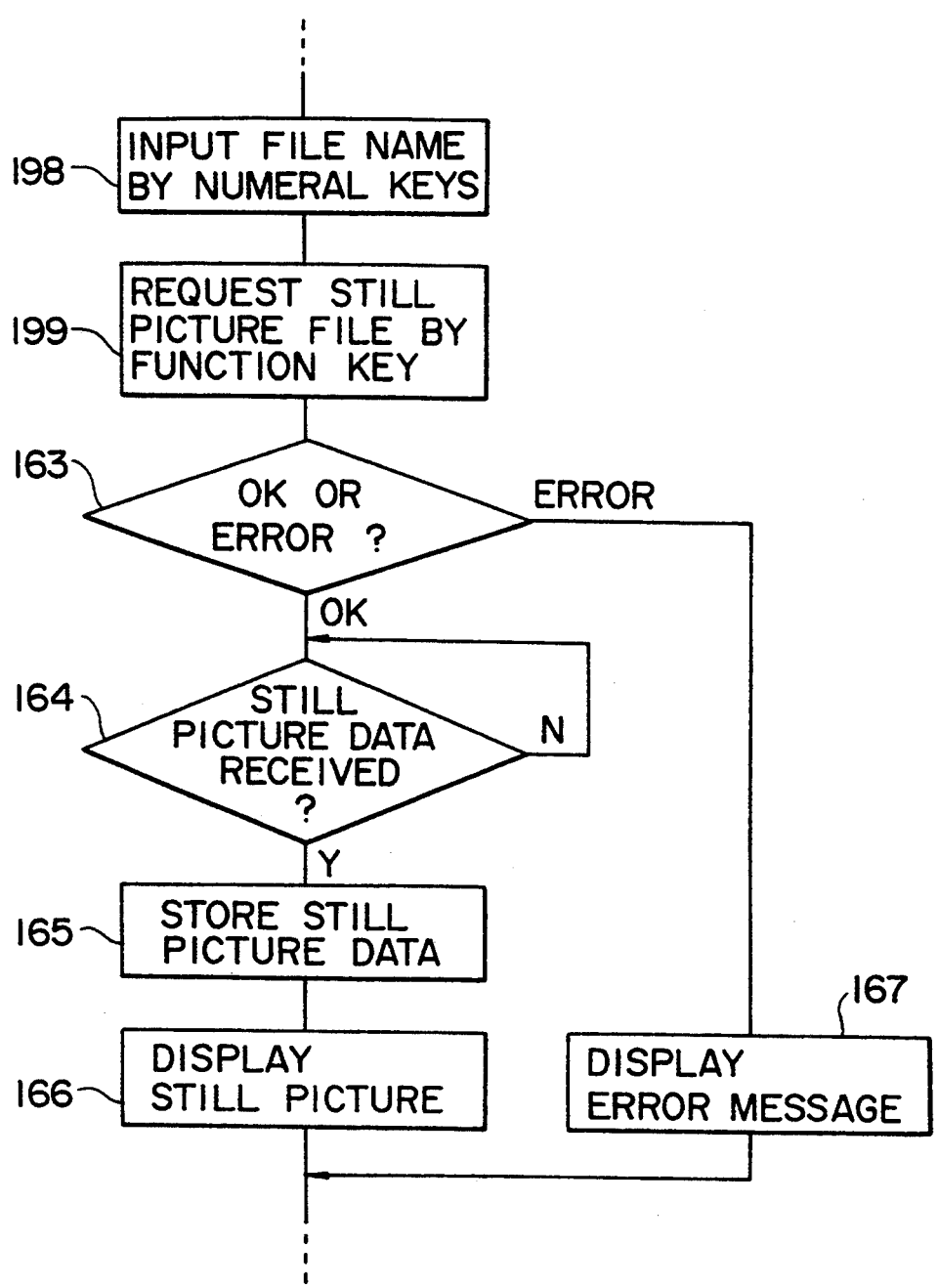
FIG. 27 is a flow chart for explaining the operation of the portable still picture transmitter in the still picture transmitting system of FIG. 1.

FIG. 27 is a flow chart for explaining the operation of the first transmitter 1 performed at the time of requesting the desired still picture file of the name input by manipulation of the numeral keys 14.

First the name of the desired still picture file is input by depressing the numeral keys 14 (shown in FIG. 2). In this case, "5", "8", "2" and "0" of the numeral keys 14 are depressed to display an input image "FILE [NAME]" of the file name on the LCD 12 (as shown in FIG. 28A).

Figure 28A:
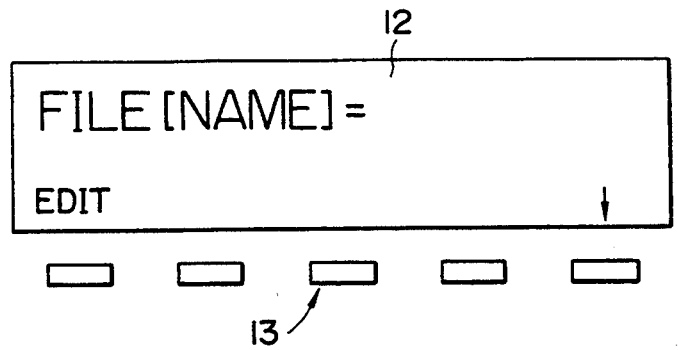
FIGS. 28A, 28B, 28C, and 28D schematically show exemplary display contents on the LCD of the portable still picture transmitter in the still picture transmitting system of FIG. 1.
Figure 28B:
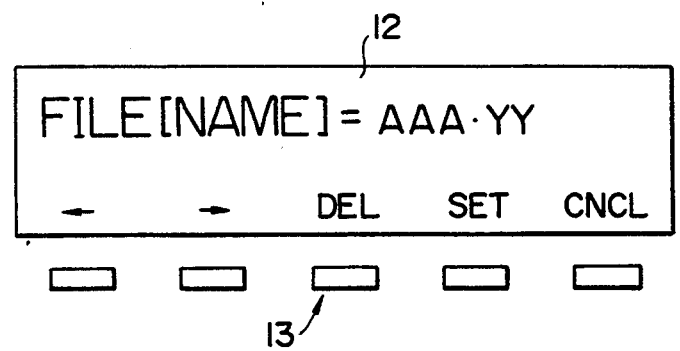

Then the right-end one of the function keys 13 is successively depressed until "EDIT" is displayed on the LCD 12 (as shown in FIG. 28A). Thereafter one of the function keys 13 corresponding to "EDIT" is depressed to place the apparatus in a character input mode. In this case, there are displayed "←", "→", "DEL", "SET" and "CNCL" on the LCD 12 correspondingly to the individual function keys 13 (as shown in FIG. 28B).

Figure 28C:
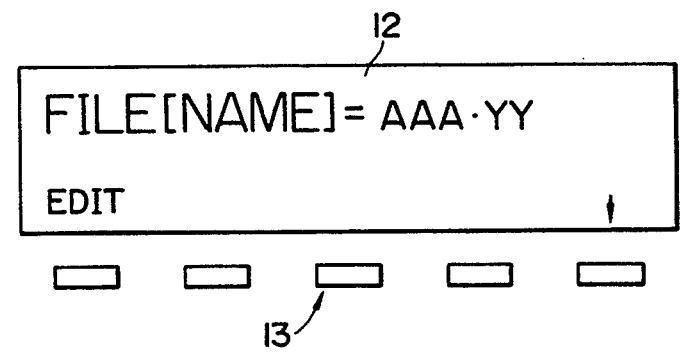

In this state, similarly to the aforementioned case of registering the retrieval condition, the name of the desired still picture file is input by depressing the numeral keys 14. FIG. 28C shows exemplary display contents on the LCD 12 obtained after termination of the character input mode subsequent to input of the file name (AAA, YY).

Figure 28D:
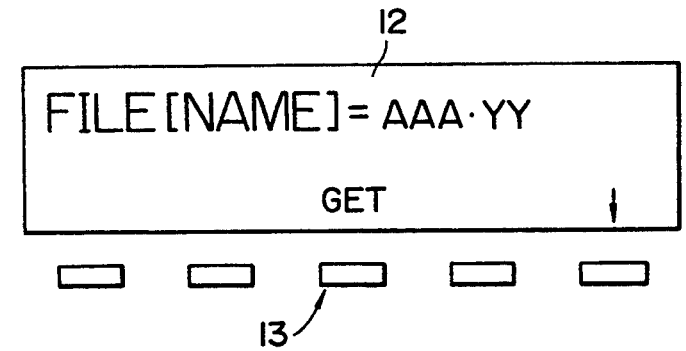

Upon completion of inputting the file name as mentioned above, the still picture file is requested by depressing the function key (step 199) of FIG. 27. In this case, the right-end one of the function keys 13 is successively depressed until "GET" is displayed on the LCD 12 (as shown in FIG. 28D). And when one of the function keys 13 corresponding to "GET" is depressed, a still picture file request is sent from the CPU 101 of the first transmitter 1 via the system bus 102 and the internal modem 111 to the second transmitter 2. Such still picture file request is relative to the still picture file of the input name.

The ensuing steps are the same as the corresponding ones in FIG. 26, according to which the first transmitter 1 receives the still picture file of the name input from the second transmitter 2, and the still picture contained in such file is displayed on the monitor 1. In case the desired still picture file of the input name is not existent on the MO disk, an eror message is displayed on the LCD 12.

Since the operation of the first transmitter 1 is the same as that shown in the flow chart of FIG. 12, a repeated explanation thereof is omitted here.

Thus, according to the portable still picture transmitter 1 in this embodiment, one numeral and alphabetic letters are allocated to each of "1" to "9" of the numeral keys 14. And in the character input mode, alphabetical capital and small letters, as well as numerals, can be input by depressing such keys. In addition, a plurality of symbols are allocated to each of "*" and "#" of the numeral keys 14, so that desired symbols can be input by depressing the corresponding keys in the character input mode.

Therefore, it becomes possible to input any desired numerals, alphabetic letters and symbols by manipulating merely a total of 12 keys inclusive of ten keys and symbol keys "*" and "#", thereby achieving effective utilization of the space of the control panel. Furthermore, the input manipulation can be simplified due to the nonnecessity of any additional correspondence table.

The embodiment mentioned above represents an example of applying the present invention to the portable still picture transmitter 1. However, it is to be understood that the present invention is also applicable to any other electronic apparatus where alphabetic letters and symbols need to be input in addition to numerals.

According to the present invention, one numeral and a predetermined number of alphabetic letters allocated to each of ten keys are input sequentially in response to every depression of the keys, or a plurality of symbols allocated to a symbol key are input sequentially in response to every depression of the symbol key, whereby alphabetic letters and so forth can be input without particular provision of exclusive keys while eliminating the necessity of any additional correspondence table. Consequently, it is rendered possible to attain a remarkably great effect by employing the present invention in a portable electronic apparatus equipped with a small-sized control panel.

In the work RAM 104 of the first transmitter 1 in this embodiment, there are stored the names of the latest 10 still picture files received from the second transmitter 2. In this case, the file names are stored sequentially at the time of reception of the relevant still picture files and, upon reception of the 11th still picture file, its name is stored as the latest one while the oldest file name is discarded.

In referring to the file names thus stored in the work RAM 104, the operation is performed by using the numeral keys 14 (shown in FIG. 2).

Figure 29A:
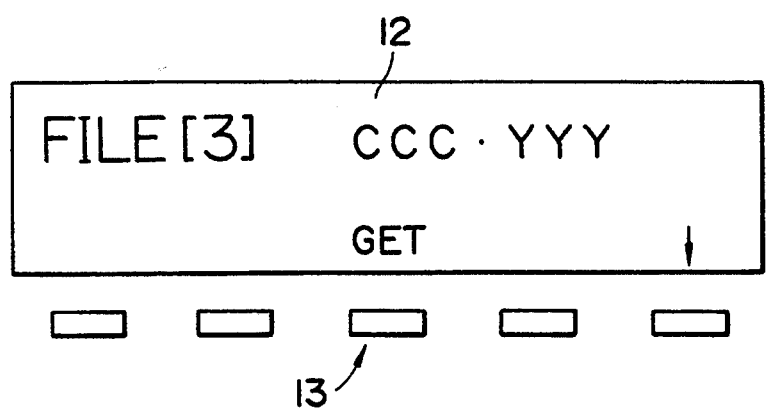
FIGS. 29A and 29B schematically show exemplary display contents on the LCD of the portable still picture transmitter in the still picture transmitting system of FIG. 1.
Figure 29B:
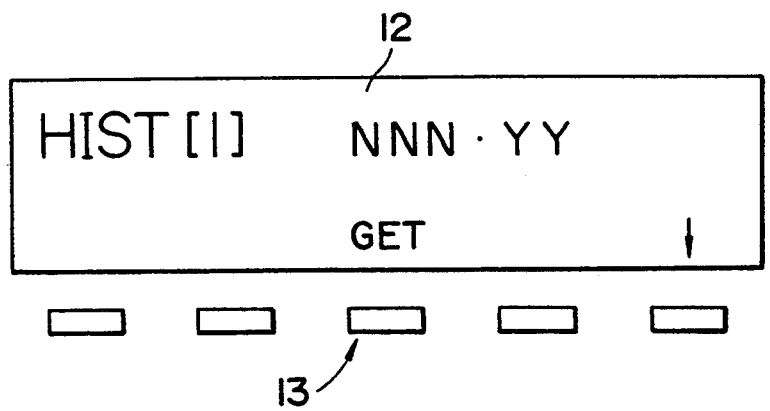

When the numeral key "6" or "9" is depressed in the state of FIG. 29A where the file name with "FILE" is displayed on the LCD 12, the oldest one of the file names stored in the work RAM 104 is displayed on the LCD 12 (as shown in FIG. 29B). And the latest file name is displayed in the order of reception in response to every depression of the numeral key "6" or "9".

Meanwhile, when the numeral key "4" or "7" is depressed in the state where the file name with "FILE" is displayed on the LCD 12, the latest one of the file names stored in the work RAM 104 is displayed on the LCD 12. And in response to every depression of the key "4" or "7", the oldest file name is displayed in the reverse order of reception.

In this case, the file name is displayed with "HIST" while being numbered sequentially from [1] which signifies the oldest one. If the number of the received still picture files is less than 10, a total of the received files can be recognized from such number.

It is possible, by depression of the key "5", to resume the former state where the file name with "FILE" is displayed on the LCD 12 (as shown in FIG. 29A).

In the first transmitter 1 of this embodiment, it is possible to display on the LCD 12 any of the names of the still picture files received in the past and to receive the relevant still picture file again.

Figure 30:
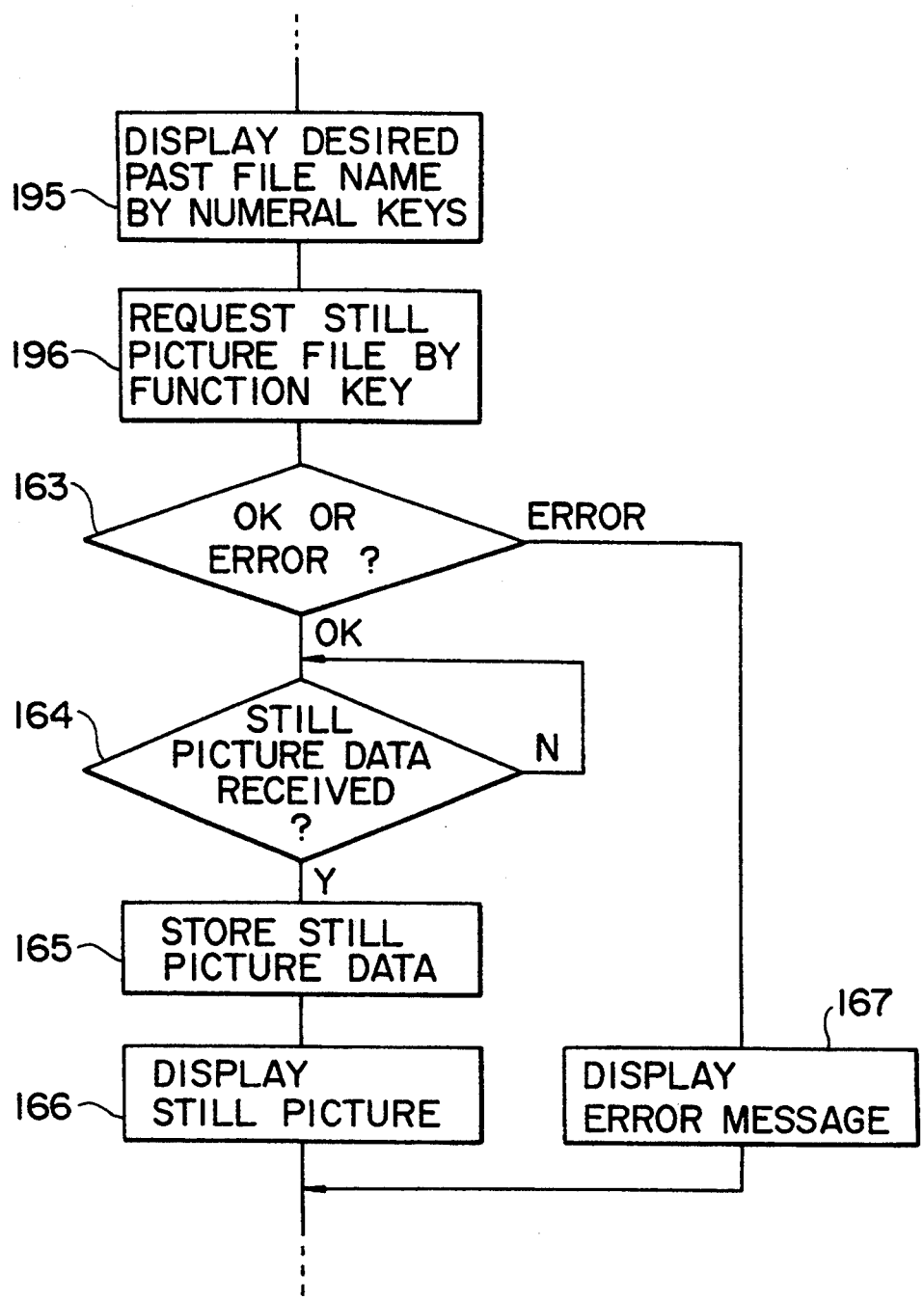
FIG. 30 is another flow chart for explaining the operation of the portable still picture transmitter in the still picture transmitting system of FIG. 1.

FIG. 30 is a flow chart for explaining the operation performed in the first transmitter 1 at the time of displaying the names of the past-received still picture files on the LCD 12 and requesting the desired still picture file again.

First, the name of the desired one of the still picture files received in the past is displayed on the LCD 12 by depressing "4", "7", "8" and "9" of the numeral keys as described above (step 195).

Subsequently the desired still picture file is requested by depressing the function key 13 (step 196). In this case, the right-end one of the function keys 13 is successively depressed until "GET" is displayed on the LCD 12 (as shown in FIG. 29B). When one of the function keys corresponding to "GET" is depressed in such state, a still picture file request is sent from the CPU 101 of the first transmitter 1 via the system bus 102 and the internal modem 111 to the second transmitter 2. This still picture file request is relative to the still picture file of the name displayed on the LCD 12 at step 195.

The ensuing steps are the same as those shown in FIG. 11, and finally the first transmitter 1 receives from the second transmitter 2 the still picture file of the name displayed on the LCD 12, and the still picture contained in such file is displayed on the monitor 1c.

Since the operation of the second transmitter 2 is the same as that shown in FIG. 12, a repeated explanation thereof is omitted here.

Thus, in this embodiment, any of the names of the still picture files received in the past can be displayed on the LCD 12 of the first transmitter 1 by using "4". "7", "8" and "9" of the numeral keys 14 in the first transmitter 1. Consequently it becomes possible in the first transmitter 1 to easily receive again the past still picture file with reference to the display content on the LCD 12.

As the file names are displayed on the LCD 12 while being numbered sequentially in the order of reception from the oldest one, it is possible to detect the order of reception of the past still picture files. Therefore, in finding out a desired still picture file while watching the display contents of the still picture files received continuously, the file name can be confirmed with facility in reference to the displayed name on the LCD 12.

Furthermore, when a still picture file request is sent by using the function key 13 in the state where one of the names of the past still picture files is displayed on the LCD 12 of the first transmitter 1, the desired still picture file can be received again. Namely, any of the still picture files received in the past can be received again by a simplified key manipulation.

The embodiment described above represents an example for storing merely 10 file names in the work RAM 104, but the maximum number of storable files is not limited thereto and may be changed to any value suited for the individual requirement in use of the apparatus.

Also in the above embodiment, the magneto-optical disk unit 4 is employed as a file unit connected to the stationary still picture transmitter 2. However, it is to be understood that the present invention is similarly applicable to some other construction where the file unit is replaced with an optical disk unit, a magnetic disk unit or the like.

Further in the above embodiment, the portable still picture transmitter 1 and the stationary still picture transmitter 2 are mutually connected via the telephone line 5 to constitute a still picture transmitting system. However, it is a matter of course that the present invention is applicable also to another still picture transmitting system where a plurality of stationary still picture transmitters are connected to each other.

According to the present invention, as described hereinabove, the names of a predetermined number of the latest-received still picture files are stored in the memory means of the first still picture transmitter, so that any of the names of the past still picture files can be confirmed to consequently achieve remarkable enhancement in the operational convenience and facility of the first still picture transmitter.

What is claimed is:

1. A system for transmitting still picture data between a first still picture transmitter with a display device and a keyboard disposed on one panel, and a second still picture transmitter with a display device and a keyboard disposed separately comprising:
   memory means for storing a plurality of still picture files with individual file names;
   transfer means for transmitting or receiving the still picture files and the file names therethrough, said memory means and said transfer means adapted to form part of said second still picture transmitter; and
   control means adapted to form part of said first still picture transmitter for reading out data of said still picture files from said memory means via the transfer means of said second still picture transmitter.

2. The system according to claim 1, wherein the keyboard of said first still picture transmitter further comprises: ten keys to each of which one numeral and a predetermined number of alphabetic letters are allocated; and character code output means for outputting, in response to a depression of one of said ten keys, a code signal representative of the numeral or the alphabetic letter allocated thereto.

3. The system according to claim 1, wherein the keyboard of said first still picture transmitter further comprise: a key to which a plurality of symbols are allocated; and character code output means for sequentially outputting the allocated symbols in response to depressions of said key.

4. The system according to claim 1, wherein said first still picture transmitter further comprises file name memory means for storing a predetermined number of said file names read out sequentially from said memory means forming part of said second still picture transmitter.

5. The system according to claim 1, wherein said memory means further comprises a still picture file unit.

6. A system for transmitting still picture data between a first still picture transmitter with a display device and a keyboard disposed on one panel, and a second still picture transmitter with a display device and a keyboard disposed separately comprising:

memory means for storing a plurality of still picture files with individual file names; transfer means for transmitting or receiving the still picture files and the file names therethrough, said memory means and said transfer means adapted to form part of said second still picture transmitter;

set means for setting a retrieval condition of the file name, said set means adapted to be part of said first still picture transmitter; and control means adapted to form part of said first still picture transmitter for reading out data representing a file satisfying said retrieval condition set by said set means, from said memory means via the transfer means forming part of said second still picture transmitter.

7. A system for transmitting still picture data between a first still picture transmitter with a display device and a keyboard disposed on one panel, and a second still picture transmitter with a display device and a keyboard disposed separately comprising:

memory means for storing a plurality of still picture files with individual file names;

transfer means for transmitting or receiving the still picture files and the file names therethrough, said memory means and said transfer means adapted to form part of said second still picture transmitter;

input means for inputting the file names, said input means adapted to form part of said fist still picture transmitter; and control means adapted to form part of said first still picture transmitter for reading out data representing a still picture corresponding to the input file name, from said memory means via the transfer means forming part of said second still picture transmitter.

8. A system for transmitting still picture data between a first still picture transmitter with a display device and a keyboard disposed on one panel, and a second still picture transmitter with a display device and a keyboard disposed separately comprising:

memory means for storing a plurality of still picture files with a respective plurality of individual file names;

transfer means for transmitting or receiving the still picture files and the file names therethrough, said memory means and said transfer means adapted to form part of said second still picture transmitter;

file name memory means for storing a plurality of file names, said file name memory means adapted to form part of said first still picture transmitter; and control means adapted to form part of said first still picture transmitter for reading out data representing still pictures corresponding respectively to said plurality of file names stored in said file name memory means, from said memory means via the transfer means of said second still picture transmitter.

9. The system according to claim 8, wherein said first still picture transmitter further comprises: designating means for designating a desired one of said plurality of file names stored in said file name memory means; and said control means being further adapted to read out the data representing the still picture corresponding to the file name designated by said designating means, from said memory means via the transfer means forming part of said second still picture transmitter.

10. The system according to claim 8, wherein said first and second still picture transmitters are mutually connected via a telephone line.

* * * * *